United States Patent
Ando et al.

(10) Patent No.: US 8,574,335 B2
(45) Date of Patent: Nov. 5, 2013

(54) HOLDING SEALING MATERIAL, EXHAUST GAS PURIFYING APPARATUS, AND METHOD OF MANUFACTURING EXHAUST GAS PURIFYING APPARATUS

(75) Inventors: Hisashi Ando, Takahama (JP); Takahiko Okabe, Takahama (JP)

(73) Assignee: Ibiden Co., Ltd., Ogaki-shi (JP)

( * ) Notice: Subject to any disclaimer, the term of this patent is extended or adjusted under 35 U.S.C. 154(b) by 12 days.

(21) Appl. No.: 13/351,225

(22) Filed: Jan. 17, 2012

(65) Prior Publication Data

US 2012/0186209 A1     Jul. 26, 2012

(30) Foreign Application Priority Data

Jan. 20, 2011     (JP) .................................. 2011-010166

(51) Int. Cl.
*B01D 39/06* (2006.01)
*B01D 39/14* (2006.01)
*B01D 24/00* (2006.01)
*B01D 50/00* (2006.01)

(52) U.S. Cl.
USPC ................. 55/523; 55/522; 55/524; 422/169; 422/170; 422/171; 422/172; 422/177; 422/178; 422/179; 422/180; 422/181; 422/182

(58) Field of Classification Search
USPC ............. 55/522–524; 422/169–172, 177–182
See application file for complete search history.

(56) References Cited

U.S. PATENT DOCUMENTS

| | | | | |
|---|---|---|---|---|
| 5,259,190 A * | 11/1993 | Bagley et al. | .................... | 60/300 |
| 5,465,573 A * | 11/1995 | Abe et al. | ......................... | 60/274 |
| 6,090,172 A * | 7/2000 | Dementhon et al. | ......... | 55/282.3 |
| 6,540,816 B2 * | 4/2003 | Allie et al. | ...................... | 95/278 |
| 7,261,865 B2 * | 8/2007 | Bruck | ........................... | 422/180 |
| 7,736,717 B2 * | 6/2010 | Muller | .......................... | 428/116 |
| 7,794,672 B2 * | 9/2010 | Cai et al. | ...................... | 422/180 |
| 7,874,144 B2 * | 1/2011 | Bruck | ............................. | 60/285 |
| 8,080,081 B2 * | 12/2011 | Bruck | ............................. | 55/523 |
| 8,292,987 B2 * | 10/2012 | Gonze et al. | ........................ | 95/1 |
| 2001/0043890 A1 * | 11/2001 | Son | ................................ | 422/174 |
| 2003/0086841 A1 * | 5/2003 | Bruck et al. | ............. | 422/186.04 |
| 2003/0091480 A1 | 5/2003 | Yamaguchi et al. | | |
| 2003/0161766 A1 * | 8/2003 | Bruck | ............................ | 422/174 |
| 2004/0105792 A1 * | 6/2004 | Worner et al. | ................ | 422/180 |
| 2005/0022382 A1 * | 2/2005 | Bruck et al. | ..................... | 29/890 |
| 2005/0170957 A1 * | 8/2005 | Maus et al. | .................... | 502/439 |
| 2006/0204408 A1 * | 9/2006 | Son | ................................. | 422/177 |
| 2007/0266686 A1 * | 11/2007 | Bruck | ............................ | 55/523 |
| 2008/0041042 A1 * | 2/2008 | Sinha et al. | ..................... | 60/299 |

FOREIGN PATENT DOCUMENTS

| | | |
|---|---|---|
| DE | 10301233 | 7/2004 |
| DE | 102004063546 | 7/2006 |
| DE | 102008047752 | 3/2010 |
| JP | 5-269387 | 10/1993 |

* cited by examiner

*Primary Examiner* — Amber Orlando
(74) *Attorney, Agent, or Firm* — Ditthavong Mori & Steiner, P.C.

(57) ABSTRACT

A holding sealing material includes inorganic fibers, a mat shape, a first end face and a second end face and a penetration portion. The mat shape has a width direction, a length direction and a thickness direction. The first end face and the second end face are each provided approximately in parallel with the width direction. The penetration portion penetrates the holding sealing material in the thickness direction.

37 Claims, 19 Drawing Sheets

C-C line cross-sectional view

A-A line cross-sectional view

B-B line cross-sectional view

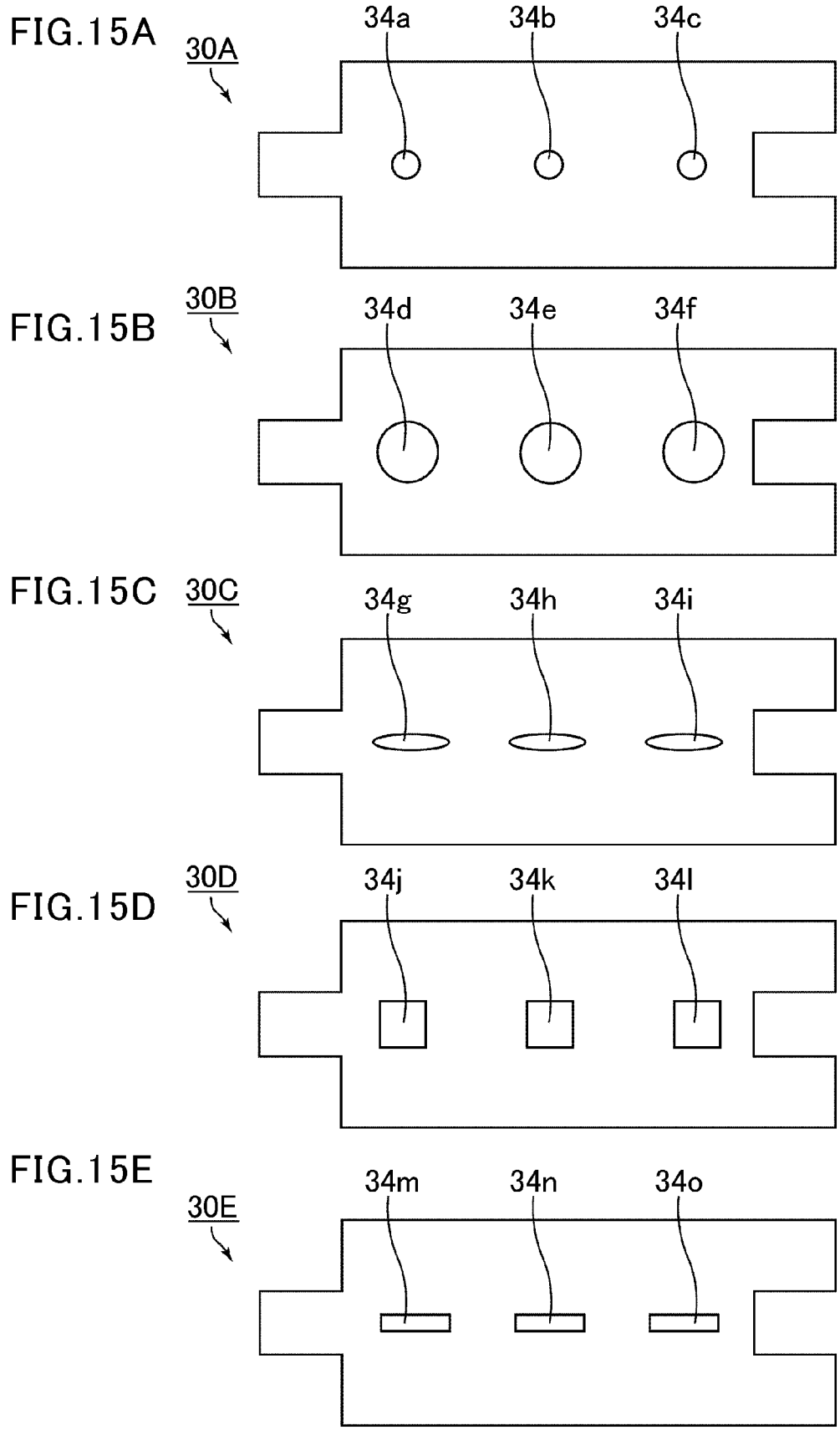

HOLDING SEALING MATERIAL, EXHAUST GAS PURIFYING APPARATUS, AND METHOD OF MANUFACTURING EXHAUST GAS PURIFYING APPARATUS

CROSS-REFERENCE TO RELATED APPLICATIONS

The present application claims priority under 35 U.S.C. §119 to Japanese Patent Application No. 2011-010166, filed on Jan. 20, 2011, the contents of which are incorporated herein by reference in their entirety.

BACKGROUND OF THE INVENTION

1. Field of the Invention

The present invention relates to a holding sealing material, an exhaust gas purifying apparatus, and a method of manufacturing an exhaust gas purifying apparatus.

2. Discussion of the Background

In order to purify harmful substances such as toxic gases contained in exhaust gas discharged from an internal combustion engine such as an engine, conventionally an exhaust gas purifying apparatus is installed in an exhaust path (exhaust pipe for exhaust gas distribution, and the like) of the internal combustion engine.

The exhaust gas purifying apparatus has a structure in which a casing is provided in the exhaust path of the internal combustion engine, and an exhaust gas-treating body is disposed inside the casing. Examples of the exhaust gas-treating body include a catalyst carrier or a diesel particulate filter (DPF).

For improving the efficiency of purifying harmful substances of the exhaust gas purifying apparatus in which a catalyst is supported on the exhaust gas-treating body, temperatures in the exhaust path of the internal combustion engine and exhaust gas need to be maintained at temperatures suitable for activating the catalyst (hereinafter, also referred to as catalyst activation temperature).

As described earlier, the exhaust gas purifying apparatus in which a catalyst is supported on the exhaust gas-treating body tends not to exert a sufficient catalytic action unless the temperature is raised to a predetermined catalyst activation temperature. Therefore, the exhaust gas purifying apparatus soon after starting the engine problematically requires a certain period of time to achieve a sufficient level of the exhaust gas purification ability.

For solving the problems, electrically heated catalyst (EHC) converters for rapidly heating a catalyst have been proposed to reduce harmful substances discharged immediately after starting the engine.

For example, JP-A 5-269387 discloses a catalytic converter (exhaust gas purifying apparatus) in which a metallic exhaust gas-treating body is provided in a metallic shell (casing), and positive and negative electrode members connected to a metallic catalyst carrier (exhaust gas-treating body) are provided in a manner to insulatingly penetrate the metallic shell wall and project therefrom.

FIG. 1A is a cross-sectional view schematically showing a conventional exhaust gas purifying apparatus disclosed in JP-A 5-269387. FIG. 1B is a C-C line cross-sectional view of the conventional exhaust gas purifying apparatus shown in FIG. 1A.

In a conventional catalytic converter (exhaust gas purifying apparatus) 600 shown in FIG. 1A and FIG. 1B, metallic catalyst carriers (exhaust gas-treating bodies) 630a, 630b, and 630c are disposed in a metallic shell (casing) 620. The outer surfaces of the metallic catalyst carriers 630a, 630b, and 630c are respectively connected to positive electrode members 650a, 650b, and 650c, and further respectively connected to negative electrode members 650d, 650e, and 650f, with another end of each of the positive and negative electrode members penetrating the metallic shell 620.

Moreover, in the conventional catalytic converter 600 shown in FIG. 1A and FIG. 1B, ring-shaped mat members (holding sealing material) 610a, 610b, and 610c are respectively disposed between outer faces of the metallic catalyst carriers 630a, 630b, and 630c and inner faces of the metallic shell 620.

The contents of JP-A 5-269387 are incorporated herein by reference in their entirety.

SUMMARY OF THE INVENTION

According to one aspect of the present invention, a holding sealing material includes inorganic fibers, a mat shape, a first end face and a second end face and a penetration portion. The mat shape has a width direction, a length direction and a thickness direction. The first end face and the second end face are each provided approximately in parallel with the width direction. The penetration portion penetrates the holding sealing material in the thickness direction.

According to another aspect of the present invention, an exhaust gas purifying apparatus includes casing provided with a hole, an exhaust gas-treating body housed in the casing, and a holding sealing material. The holding sealing material is wound around the exhaust gas-treating body and disposed between the exhaust gas-treating body and the casing. The holding sealing material includes inorganic fibers, a mat shape having a width direction, a length direction and a thickness direction, a first end face and a second end face each provided approximately in parallel with the width direction and at least one penetration portion penetrating the holding sealing material in the thickness direction. A position of the penetration portion of the holding sealing material wound around the exhaust gas-treating body is identical with a position of the hole of the casing.

According to further aspect of the present invention, a method of manufacturing an exhaust gas purifying apparatus includes providing a holding sealing material. The holding sealing material includes inorganic fibers. The holding sealing material has a mat shape which has a width direction, a length direction and a thickness direction. The holding sealing material has a first end face and a second end face each provided approximately in parallel with the width direction. The holding sealing material has at least one penetration portion penetrating the holding sealing material in the thickness direction. The holding sealing material is wound around an exhaust gas-treating body. The exhaust gas-treating body is housed in a casing to dispose the holding sealing material between the exhaust gas-treating body and the casing having a hole. A position of the penetration portion of the holding sealing material wound around the exhaust gas-treating body is adjusted with the hole of the casing.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 15A, FIG. 15B, FIG. 15C, FIG. 15D and FIG. 15E each are a plain view schematically showing an example of a holding sealing material according to a third embodiment of the present invention.

DESCRIPTION OF THE EMBODIMENTS

Figure 1A:
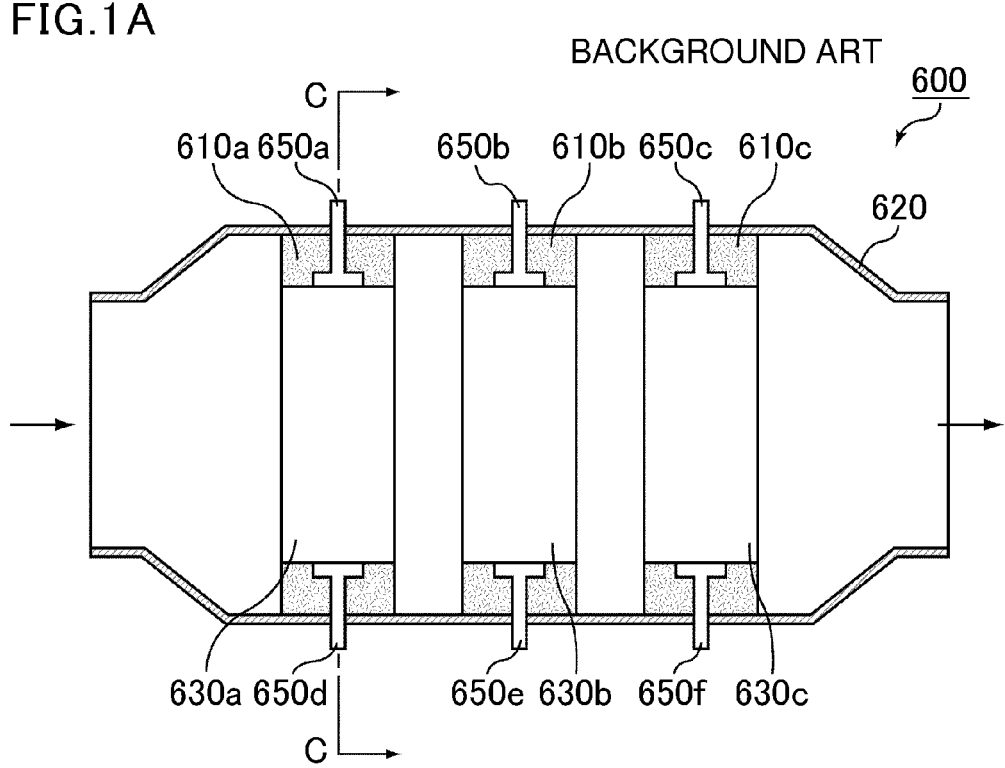
FIG. 1A is a cross-sectional view schematically showing a conventional exhaust gas purifying apparatus.
Figure 1B:
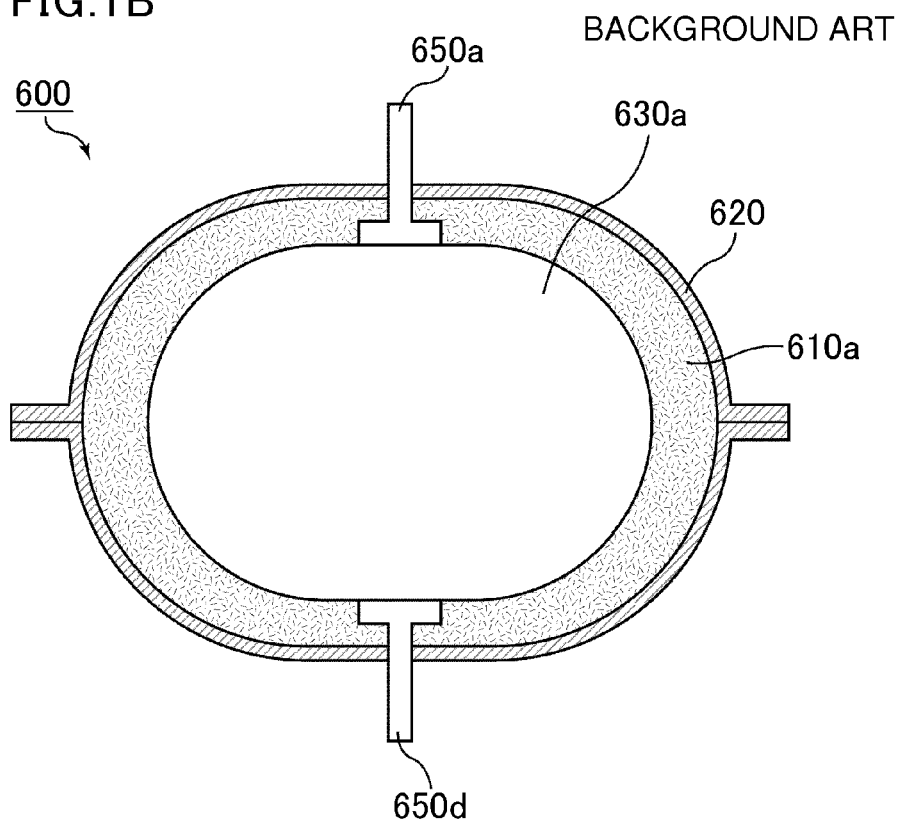
FIG. 1B is a C-C line cross-sectional view of the conventional exhaust gas purifying apparatus shown in FIG. 1A.

In an electrically heated catalyst converter which is one type of exhaust gas purifying apparatus, an electrode member penetrates a casing, passes through a holding sealing material, and then contacts an exhaust gas-treating body. Further, a sensor for measuring temperatures of the exhaust gas-treating body may penetrate the casing, pass through the holding sealing material, and contact the exhaust gas-treating body.

In the embodiments of the present invention, it is allowed to provide a holding sealing material which makes it easier to dispose at least one of an electrode member and a sensor (hereinafter, at least one of an electrode member and a sensor is also referred to as an electrode member or the like) when the holding sealing material is used in an exhaust gas purifying apparatus, an exhaust gas purifying apparatus using the holding sealing material, and a method of manufacturing the exhaust gas purifying apparatus.

In the embodiments of the present invention, use of a holding sealing material having a penetration portion formed therein makes it easier to dispose at least one of an electrode member and a sensor at a penetration portion of the holding sealing material.

The holding sealing material according to the embodiment of the present invention is a holding sealing material having a mat shape, including inorganic fibers and having a first end face and a second end face each provided in approximately parallel with a width direction of the holding sealing material, wherein at least one penetration portion penetrating the holding sealing material in a thickness direction is formed.

The holding sealing material according to the embodiment of the present invention has at least one penetration portion which penetrates the holding sealing material in the thickness direction. Therefore, if an exhaust gas purifying apparatus is manufactured by using the holding sealing material according to the embodiment of the present invention, at least one of an electrode member and a sensor tends to be disposed at the penetration portion of the holding sealing material.

In the holding sealing material according to the embodiment of the present invention, two or more of the penetration portions are preferably formed.

If an exhaust gas purifying apparatus is manufactured by using the above holding sealing material, since the holding sealing material is provided with a plurality of the penetration portions, at least one of an electrode and a sensor tends to be disposed at each of the penetration portions.

In the holding sealing material according to the embodiment of the present invention, a pair of the penetration portions among the two or more penetration portions are preferably formed at positions approximately line-symmetrical with respect to a center line of the holding sealing material in the width direction, at positions approximately line-symmetrical with respect to a center line of the holding sealing material in the length direction, or at positions approximately point-symmetrical with respect to a center of the holding sealing material.

In the case that a plurality of the penetration portions are formed in the holding sealing material, since the areas of the penetration portions are reduced from the area of the holding sealing material, the holding power and the tensile strength of the holding sealing material tend to decrease. However, forming a pair of the penetration portions at positions approximately line-symmetrical with respect to a center line of the holding sealing material in the width direction, at positions approximately line-symmetrical with respect to a center line of the holding sealing material in the length direction, or at positions approximately point-symmetrical with respect to the center of the holding sealing material tends to prevent the decrease in the holding power and the tensile strength of the holding sealing material because the positions of the penetration portions are less likely to be localized. Moreover, if a pair of the penetration portions are formed at the aforementioned positions, the positions of the penetration portions are less likely to be localized. Therefore, the holding sealing material is less likely to be broken.

Meanwhile, the term "a pair of penetration portions" refers to two penetration portions among the two or more penetration portions formed in the holding sealing material.

In the holding sealing material according to the embodiment of the present invention, a pair of the penetration portions are preferably formed at positions approximately line-symmetrical with respect to a center line of the holding sealing material in the width direction, and the distance between the pair of the penetration portions is preferably about 50% the length of the holding sealing material in the length direction.

If a pair of the penetration portions are formed at the aforementioned positions, the pair of the penetration portions tend to face each other when the holding sealing material is wound around an object to be wound, such as an exhaust gas-treating body. Therefore if an electrically heated catalyst converter is manufactured by using the above holding sealing material, an electrode member tends to be disposed at each of the penetration portions facing each other in the holding sealing material. As a result, heat generated by the two electrodes facing each other tends to be approximately evenly transmitted to the exhaust gas-treating body, which tends to achieve efficient heating of the exhaust gas-treating body.

In the holding sealing material according to the embodiment of the present invention, each of the first end face and the second end face of the holding sealing material is preferably provided with a step consisting of at least one projected portion.

In the case that a step is provided in each of the first end face and the second end face of the holding sealing material, the holding sealing material is more likely to be engaged by the projected portion of the holding sealing material. Therefore, exhaust gas is less likely to leak from the engaged part, and thus exhaust gas sealing property of the holding sealing material tends to be maintained. Moreover, in the case that a step is provided in each of the first end face and the second end face of the holding sealing material, the holding sealing material is more likely to be engaged by the projected portion. Therefore, even if force is applied on the exhaust gas purifying apparatus in the width direction of the holding sealing material, the holding sealing material is less likely to be displaced from the exhaust gas-treating body.

In the holding sealing material according to the embodiment of the present invention, the penetration portion of the holding sealing material is preferably formed at a position other than the projected portion of the holding sealing material.

Since the area of the projected portion of the holding sealing material is relatively smaller than the area of portions other than the projected portion of the holding sealing material, if the penetration portion is formed in the projected portion of the holding sealing material, the area of the projected portion of the holding sealing material becomes too small. As a result, the holding power and the tensile strength of the holding sealing material tend to decrease. In contrast, if the penetration portion is formed at a portion other than the projected portion of the holding sealing material, the area of portions having no penetration portion tends to be secured in the holding sealing material. Therefore, the tensile strength of the holding sealing material tends to be prevented from decreasing. Moreover, in the case of forming the penetration portion by punching, the area which can be punched out tends to be larger as compared with the case where the penetration portion is formed in the projected portion of the holding sealing material. Therefore, it may become easier to form the penetration portion at positions other than the projected portion of the holding sealing material.

In the holding sealing material according to the embodiment of the present invention, the penetration portion of the holding sealing material is preferably formed diagonally with respect to the thickness direction of the holding sealing material.

In the case of manufacturing an exhaust gas purifying apparatus by a stuffing method, upon stuffing an exhaust gas-treating body with the holding sealing material wound therearound into the casing, a shearing force tends to occur in a direction opposite to the stuffing direction. If the above holding sealing material is used, the direction of the penetration portion in the holding sealing material tends to change due to the shearing force, and the direction of the penetration portion after the stuffing consequently tends to be approximately perpendicular to the length direction of the holding sealing material. As a result, at least one of an electrode member and a sensor tends to be easily disposed at the penetration portion of the holding sealing material.

The exhaust gas purifying apparatus according to the embodiment of the present invention is an exhaust gas purifying apparatus including a casing provided with a hole, an exhaust gas-treating body housed in the casing, and a holding sealing material wound around the exhaust gas-treating body and disposed between the exhaust gas-treating body and the casing, wherein the holding sealing material is the holding sealing material according to the embodiments of the present invention, and the position of the penetration portion of the holding sealing material wound around the exhaust gas-treating body is identical with the position of the hole of the casing.

In the exhaust gas purifying apparatus according to the embodiment of the present invention, the position of the penetration portion of the holding sealing material wound around the exhaust gas-treating body is identical with the position of the hole of the casing. Therefore, a member to be connected to the exhaust gas-treating body through the casing tends to be disposed in the penetration portion of the holding sealing material and the hole of the casing.

The exhaust gas-purifying apparatus according to the embodiment of the present invention preferably further includes at least one of an electrode member and a sensor, which is connected to the exhaust gas-treating body, passes through the holding sealing material, and penetrates the casing, wherein at least one of the electrode member and the sensor is preferably disposed at the penetration portion of the holding sealing material and the hole of the casing.

As mentioned above, in the exhaust gas purifying apparatus according to the embodiment of the present invention, at least one of an electrode member and a sensor tends to be disposed at the penetration portion formed in the holding sealing material. In particular, the exhaust gas purifying apparatus in which an electrode member is disposed at the penetration portion of the holding sealing material tends to be used as an electrically heated catalyst converter.

The exhaust gas purifying apparatus according to the embodiment of the present invention is preferably manufactured by a method including the steps of housing the exhaust gas-treating body with the holding sealing material wound therearound in the casing, adjusting the position of the penetration portion of the holding sealing material wound around the exhaust gas-treating body with the hole of the casing, and disposing at least one of the electrode member and the sensor in a manner connecting to the exhaust gas-treating body, passing through the holding sealing material and penetrating the casing, wherein, in the housing step, the exhaust gas-treating body with the holding sealing material wound therearound is stuffed into the casing, or the exhaust gas-treating body with the holding sealing material wound therearound is inserted in the casing, and thereafter the inner diameter of the casing is preferably reduced and in the disposing step, at least one of the electrode member and the sensor is preferably disposed at the penetration portion of the holding sealing material and the hole of the casing.

As mentioned above, the exhaust gas purifying apparatus according to the embodiment of the present invention tends to be manufactured by a stuffing method or a sizing method.

The method of manufacturing an exhaust gas purifying apparatus according to the embodiment of the present invention is a method of manufacturing an exhaust gas purifying apparatus including a casing provided with a hole, an exhaust gas-treating body housed in the casing, and a holding sealing material wound around the exhaust gas-treating body and disposed between the exhaust gas-treating body and the casing, and the method includes a step of adjusting the position of the penetration portion of the holding sealing material wound around the exhaust gas-treating body with the hole of the casing, using the holding sealing material according to the embodiments of the present invention as the holding sealing material.

The exhaust gas purifying apparatus according to the embodiment of the present invention tends to be preferably manufactured by the method of manufacturing an exhaust gas purifying apparatus according to the embodiment of the present invention.

The method of manufacturing an exhaust gas purifying apparatus according to the embodiment of the present invention preferably further includes, after the adjusting step, a step of disposing at least one of an electrode member and a sensor in a manner connecting to the exhaust gas-treating body, passing through the holding sealing material, and penetrating the casing, wherein, in the disposing step, at least one of the electrode member and the sensor is preferably disposed at the penetration portion of the holding sealing material and the hole of the casing.

The exhaust gas purifying apparatus according to the embodiment of the present invention tends to be preferably manufactured by the above method of manufacturing an exhaust gas purifying apparatus.

The method of manufacturing an exhaust gas purifying apparatus according to the embodiment of the present invention preferably further includes, before the adjusting step, a step of housing the exhaust gas-treating body with the holding sealing material wound therearound in the casing, wherein, in the housing step, the exhaust gas-treating body with the holding sealing material wound therearound is stuffed into the casing, or the exhaust gas-treating body with the holding sealing material wound therearound is inserted in the casing and thereafter the inner diameter or the casing is preferably reduced.

As mentioned above, a stuffing method or a sizing method tends to be used in manufacturing an exhaust gas purifying apparatus.

The embodiments will now be described with reference to the accompanying drawings, wherein like reference numerals designate corresponding or identical elements throughout the various drawings. The present invention is not limited to embodiments below and can be appropriately applicable to other embodiments in the scope that does not change the gist of the present invention.

(First Embodiment)

Referring to the drawings, the following will describe the first embodiment that is one of the embodiments of the holding sealing material, the exhaust gas purifying apparatus, and the method of manufacturing an exhaust gas purifying apparatus according to the embodiment of the present invention.

First, the holding sealing material according to the first embodiment of the present invention is described.

Figure 2:
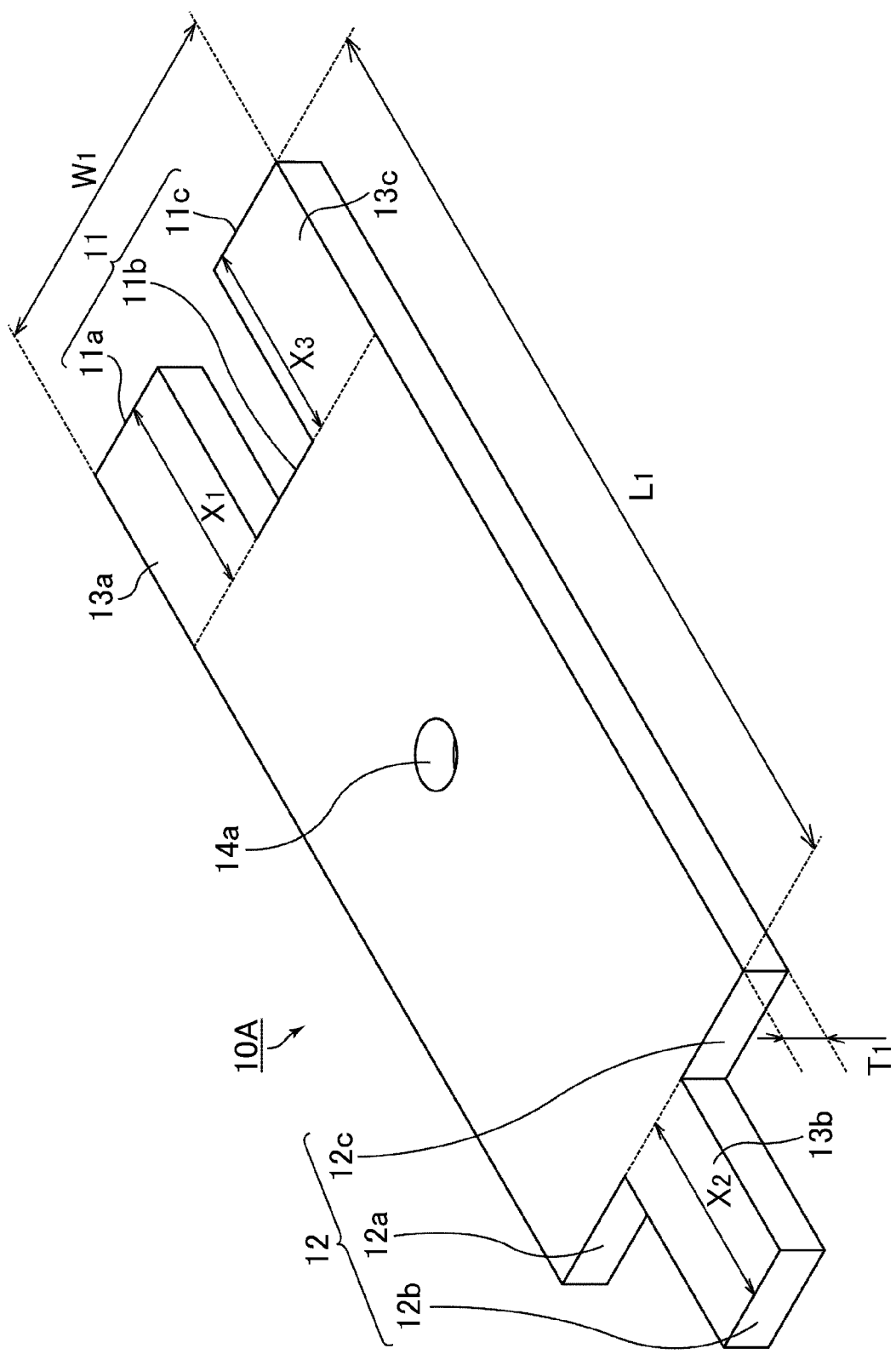
FIG. 2 is a perspective view schematically showing an example of a holding sealing material according to a first embodiment of the present invention.

FIG. 2 is a perspective view schematically showing an example of the holding sealing material according to the first embodiment of the present invention.

A holding sealing material 10A illustrated in FIG. 2 includes inorganic fibers such as alumina-silica fibers and has a mat shape. More specifically, the holding sealing material 10A has an approximately rectangular plate-like shape in a plain view having a predetermined length (shown by an arrow $L_1$ in FIG. 2), a predetermined width (shown by an arrow $W_1$ in FIG. 2), and a predetermined thickness (shown by an arrow $T_1$ in FIG. 2). Moreover, the holding sealing material 10A has a first end face 11 (11a, 11b, and 11c) and a second end face 12 (12a, 12b, and 12c) that are approximately parallel in the width $W_1$ direction of the holding sealing material 10A. Further, the holding sealing material 10A has a penetration portion 14a.

Meanwhile, the term "the length of the holding sealing material in a length direction" used herein refers to the distance between the first end face and the second end face in the length direction of the holding sealing material. Additionally, "the length of the holding sealing material in a length direction" is also simply called "the length of the holding sealing material."

In the holding sealing material of the present embodiment, each of the first end face and the second end face has a step formed by at least one projected portion.

In the holding sealing material 10A shown in FIG. 2, two projected portions 13a and 13c are formed at the first end face 11, and one projected portion 13b is formed at the second end face 12. When the first end face 11 of the holding sealing material 10A is made in contact with the second end face 12 of the holding sealing material 10A, a convex formed by the projected portion 13b tend to engage with a concave formed by the projected portion 13a and the projected portion 13c.

As mentioned earlier, in the holding sealing material 10A illustrated in FIG. 2, each of the first end face 11 and the second end face 12 has three levels of steps.

Figure 3:
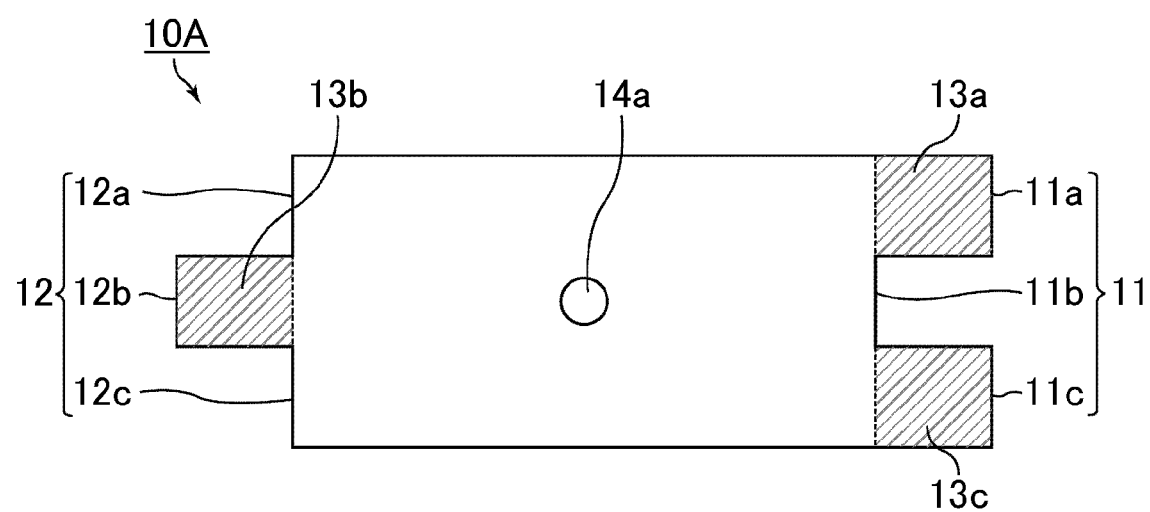
FIG. 3 is a plain view of the holding sealing material shown in FIG. 2.

FIG. 3 is a plain view of the holding sealing material shown in FIG. 2.

FIG. 3 shows specific positions of the projected portions 13a, 13b, and 13c formed in the holding sealing material 10A.

As used herein, the term "projected portion" refers to the following region.

Namely, the "projected portion" refers to a portion of the holding sealing material between an end face including the start point of a step and an end face including the end point of the step in the end faces (first end face or second end face) of the holding sealing material. Therefore, the projected portion of the holding sealing material exists at both of the side of the first end face and the side of the second end face of the holding sealing material.

In the holding sealing material according to the present embodiment, preferably the lengths of the projected portions are approximately the same in the length direction of the holding sealing material. That is, preferably the distance between the first end face and the second end face is approximately the same at any part of the holding sealing material.

Hereinafter, in the holding sealing material 10A shown in FIG. 2, the length of the projected portion 13a (shown by an arrow $X_1$ in FIG. 2), the length of the projected portion 13b (shown by an arrow $X_2$ in FIG. 2), and the length of the projected portion 13c (shown by an arrow $X_3$ in FIG. 2) in the length $L_1$ direction of the holding sealing material 10A shown in FIG. 2 are approximately the same from one another. Therefore, the holding sealing material 10A has an approximately fixed length $L_1$.

The term "approximately the same" allows not-exactly the same length, and includes such length as being considered substantially the same.

In the holding sealing material of the present embodiment, one penetration portion is formed. The one penetration portion is formed in a manner penetrating the holding sealing material in the thickness direction.

In the holding sealing material of the present embodiment, the position of the penetration portion formed is not particularly limited, but is preferably a position other than the projected portion.

In the holding sealing material of the present embodiment, examples of the shape of the penetration portion of the holding sealing material include an approximately round-pillar shape, an approximately rectangular-pillar shape, an approximately cylindroid shape, an approximately truncated cone shape, and a pillar shape having a bottom face surrounded by approximately straight line and approximately arc line. Examples of the cross-sectional shape of the penetration portion include an approximately round shape, an approximately polygonal shape such as an approximately rectangular shape, an approximately elliptical shape, an approximately race track shape, and the like.

In the case of manufacturing an exhaust gas purifying apparatus using the holding sealing material of the present embodiment, the cross-sectional shape of the penetration portion of the holding sealing material tends to be matched with the cross-sectional shape an electrode member and the like.

The cross-sectional shape of the penetration portion refers to a cross-section in approximately parallel with the main face of the holding sealing material.

As used herein, the terms "approximately round pillar shape", "approximately round shape", "approximately perpendicular", "approximately parallel" and the like indicate that the shapes may not mathematically strict and respectively include shapes which are substantially the same as "round pillar shape", "round shape", "perpendicular", "parallel" and the like.

In the holding sealing material of the present embodiment, the diameter of the cross section of the penetration portion of the holding sealing material is preferably from about 1 mm to about 100 mm and more preferably from about 20 mm to about 40 mm.

If the diameter of the cross section of the penetration portion of the holding sealing material is about 1 mm or more, since the cross-sectional area of the penetration portion of the holing sealing material is not too small, an electrode member or the like is more likely to be disposed at the penetration portion of the holding sealing material when the holding sealing material is used in the exhaust gas purifying apparatus. Meanwhile, if the diameter of the cross section of the penetration portion of the holding sealing material is about 100 mm or less, the area of the holding sealing material is not too small, which tends not to deteriorate the holding power of the holding sealing material. Moreover, if the diameter of the cross section of the penetration portion of the holding sealing material is about 100 mm or less, the area of the holding sealing material in the width direction tends not to decrease, which tends not to deteriorate the tensile strength of the holding sealing material.

Moreover, in the holding sealing material of the present embodiment, the cross-sectional area of the penetration portion of the holding sealing material is preferably from about 1 $mm^2$ to about 10000 $mm^2$, and more preferably from about 400 $mm^2$ to about 1600 $mm^2$. If the cross-sectional area of the penetration portion of the holding sealing material is about 1 $mm^2$ or more, a sufficient area for disposing at least one of an electrode member and a sensor tends to be secured in use of the holding sealing material in the exhaust gas purifying apparatus. If the cross-sectional area of the penetration portion of the holding sealing material is about 10000 $mm^2$ or less, the area of the holding sealing material is not too small, which tends not to deteriorate the holding power of the holding sealing material.

The diameter of the cross section of the penetration portion refers to a diameter of a part approximately perpendicular to the thickness direction of the holding sealing material. In the case that the cross-sectional shape of the penetration portion is not an approximately round shape, the diameter refers to the maximum length passing through the center. The diameter of the cross section of the penetration portion is, for example, the diameter of the cross section if the penetration portion has approximately round pillar shape, the longer diameter of the cross section if the penetration portion has approximately cylindroid pillar shape, and the length of the longest part in the cross section if the penetration portion has approximately rectangular pillar shape or approximately polygonal pillar shape. If the penetration portion has approximately truncated cone shape, the diameter refers to the diameter of the larger approximately circle.

In the holding sealing material 10A shown in FIG. 2, the shape of the penetration portion 14a is approximately a round-pillar shape. The shape of the cross-section of the penetration portion 14a is approximately a round shape.

FIG. 4A, FIG. 4B, FIG. 4C and FIG. 4D each are a plain view schematically showing one of other examples of the holding sealing material according to the first embodiment of the present invention.

In FIG. 4A, FIG. 4B, FIG. 4C and FIG. 4D, the diameter or the cross-section of the penetration portion or the shape of the cross-section of the penetration portion formed in the holding sealing material is different from one another.

Figure 4A:
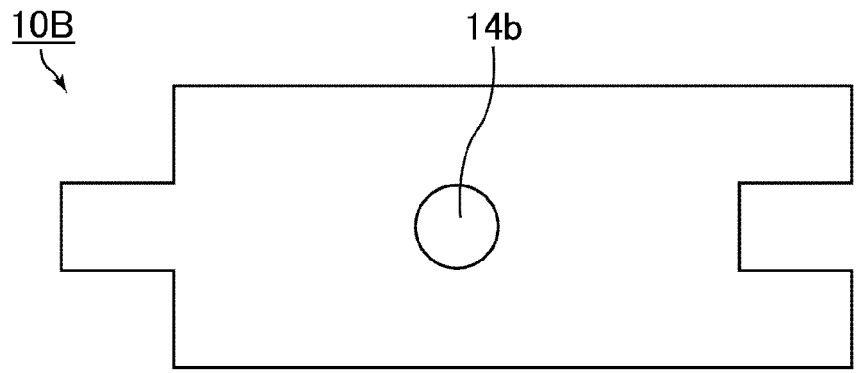
FIG. 4A, FIG. 4B, FIG. 4C and FIG. 4D each are a plain view schematically showing one of other examples of the holding sealing material according to the first embodiment of the present invention.

In the holding sealing material 10B shown in FIG. 4A, the cross-sectional shape of the penetration portion 14b is approximately a round shape similarly to the cross-sectional shape of the penetration portion 14a of the holding sealing material 10A shown in FIG. 2. The diameter of the cross-section of the penetration portion 14b of the holding sealing material 10B shown in FIG. 4A is larger than the diameter of the cross-section of the penetration portion 14a of the holding sealing material 10A shown in FIG. 2.

Figure 4B:
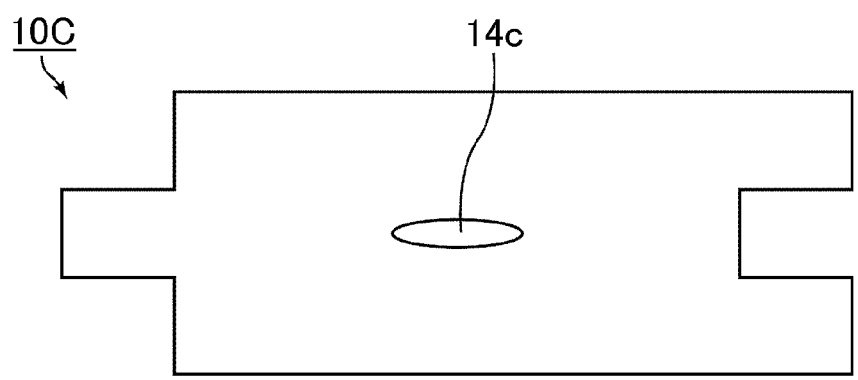
Figure 4C:
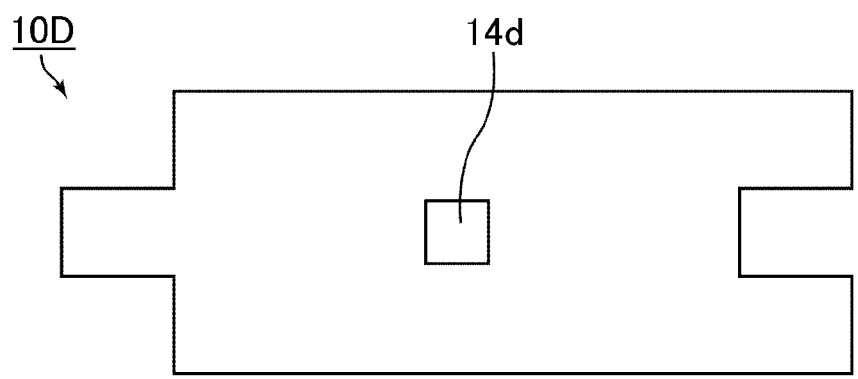
Figure 4D:
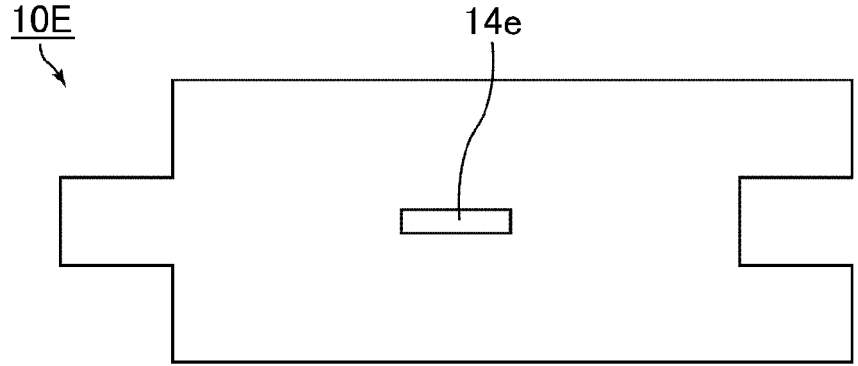

Moreover, in the holding sealing material 10C shown in FIG. 4B, the holding sealing material 10D shown in FIG. 4C, and the holding sealing material 10E shown in FIG. 4D, the cross-sectional shapes of the penetration portion 14c, the penetration portion 14d, and the penetration portion 14e each are different from the cross-sectional shape of the penetration portion 14a in the holding sealing material 10A shown in FIG. 2. The cross-sectional shapes each are an approximately elliptical shape, an approximately square shape, and an approximately rectangular shape.

The holding sealing material of the present embodiment may include a binder such as an organic binder. The binder included in the holding sealing material tends to bond the inorganic fibers forming the holding sealing material to one another. Therefore, it may become easier to reduce the volume of the holding sealing material upon stuffing the holding sealing material into the casing, or to prevent the inorganic fibers from scattering.

The holding sealing material of the present embodiment may be a needle mat obtained by carrying out a needling treatment on a base mat including inorganic fibers.

The needling treatment refers to a treatment in which needles or the like serving as a fiber entangling means are inserting and withdrawing to and from the base mat. In the holding sealing material subjected to the needling treatment, inorganic fibers having a comparatively long fiber length are more likely to be three-dimensionally entangled with one another. As a result, the strength of the needle mat tends to be improved.

One example of the method of manufacturing a holding sealing material according the present embodiment is described.

For example, a method including punching a base mat prepared by entangling inorganic fibers into a desired shape to manufacture a holding sealing material, and then punching the manufactured holding sealing material into a desired shape with a punching blade or the like to form a penetration portion may be exemplified. Also, a method including forming a penetration portion upon punching the base mat may also be exemplified.

The holding sealing material of the present embodiment can be manufactured according to the methods mentioned earlier.

Next, an exhaust gas purifying apparatus according to the first embodiment of the present invention will be described.

Figure 5A:
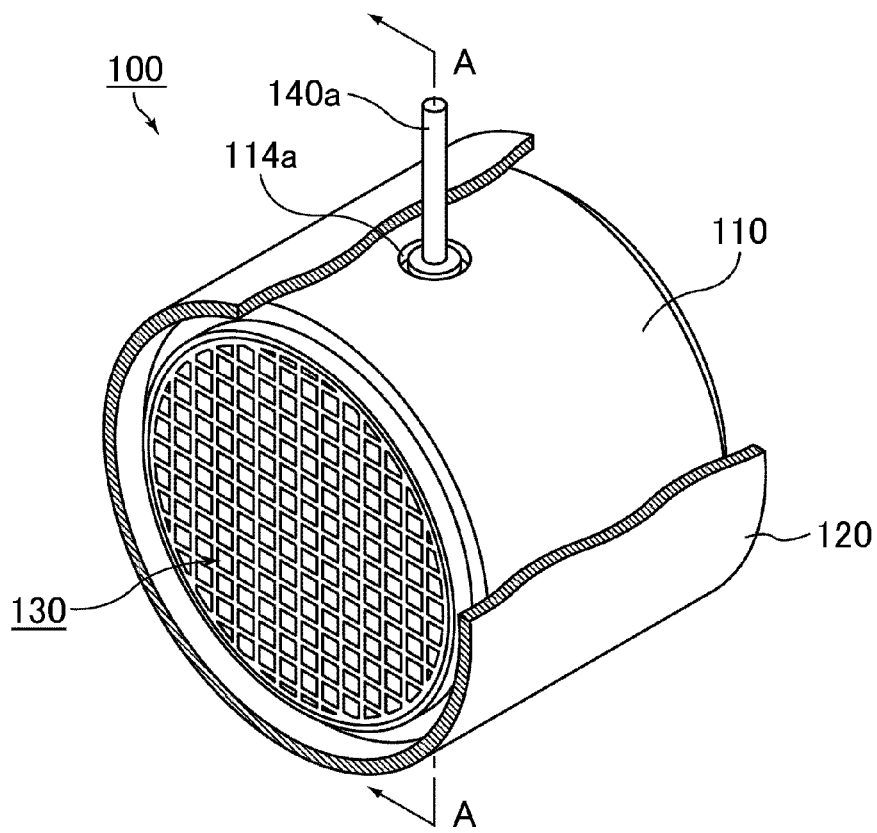
FIG. 5A is a perspective cross-sectional cutaway view schematically showing an example of an exhaust gas purifying apparatus according to the first embodiment of the present invention.
Figure 5B:
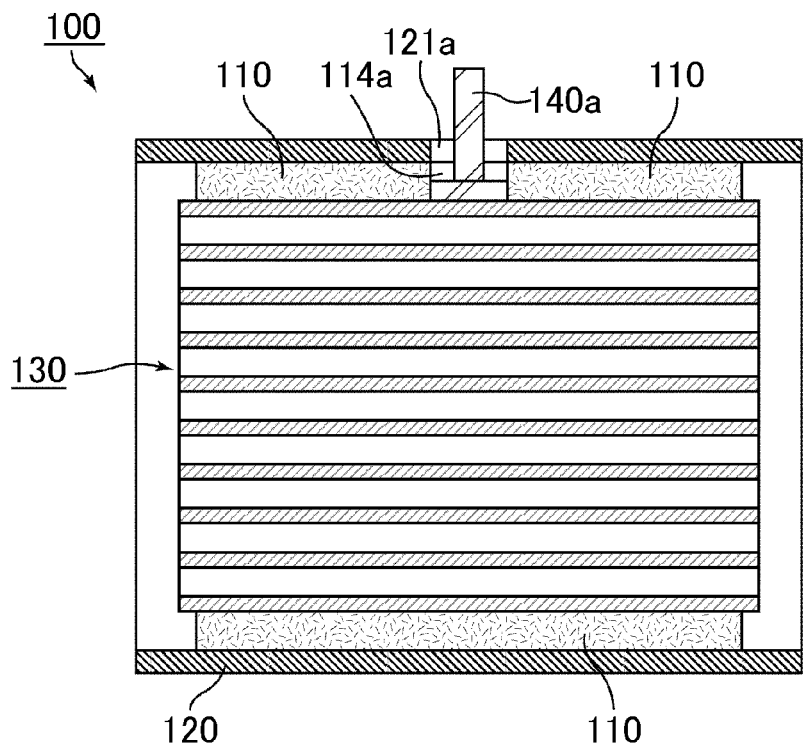
FIG. 5B is an A-A line cross-sectional view of the exhaust gas purifying apparatus shown in FIG. 5A.

FIG. 5A is a perspective cross-sectional cutaway view schematically showing an example of an exhaust gas purifying apparatus according to the first embodiment of the present invention. FIG. 5B is an A-A line cross-sectional view of the exhaust gas purifying apparatus shown in FIG. 5A.

An exhaust gas purifying apparatus 100 shown in FIG. 5A and FIG. 5B includes a casing 120, an exhaust gas-treating body 130 housed in the casing 120, and a holding sealing material 110 disposed between the exhaust gas-treating body 130 and the casing 120.

The exhaust gas purifying apparatus 100 further includes a sensor 140a which is connected to the exhaust gas-treating body 130, passes through the holding sealing material 110, and penetrates the casing 120.

The holding sealing material 110 is wound around the exhaust gas-treating body 130. The exhaust gas-treating body 130 is held by the holding sealing material 110.

An inlet pipe for introducing exhaust gas discharged from the internal combustion engine and an exhaust pipe for discharging the exhaust gas having passed through the exhaust gas-treating body to the outside are connected to an end of the casing 120, if necessary.

The following description will discuss the holding sealing material forming the exhaust gas purifying apparatus of the present embodiment.

The exhaust gas purifying apparatus of the present embodiment uses the holding sealing material of the present embodiment.

FIG. 5A and FIG. 5B show an example of an exhaust gas purifying apparatus 100 in which the holding sealing material 10A illustrated in FIG. 2 is used as the holding sealing material 110.

As shown in FIG. 5A and FIG. 5B, a penetration portion 114a is formed in the holding sealing material 110 which is wound around an exhaust gas-treating body 130. A sensor 140a is disposed at the penetration portion 114a.

In the exhaust gas purifying apparatus of the present embodiment, the first end face and the second end face of the holding sealing material may contact each other without a gap or may form a gap of a predetermined size.

In the case that a gap is formed between the first end face and the second end face of the holding sealing material, at least one of an electrode member and a sensor tends to be disposed at the gap. In the case that a gap is formed between the first end face and the second end face of the holding sealing material, the distance between the first end face and the second end face of the holding sealing material is preferably about 100 mm or less, more preferably from about 20 mm to about 100 mm, and further preferably from about 20 mm to about 40 mm. If the distance between the first end face and the second end face of the holding sealing material is about 100 mm or less, the area of the holding sealing material that contacts the exhaust gas-treating body tends not to decrease. The holding sealing material thus tends to hold the exhaust gas-treating body. If the distance between the first end face and the second end face of the holding sealing material is about 20 mm or more, the gap is not too small. Thus, at least one of an electrode member and a sensor tends to be easily disposed at the gap.

The following description will discuss the exhaust gas-treating body forming the exhaust gas purifying apparatus of the present embodiment.

Figure 6:
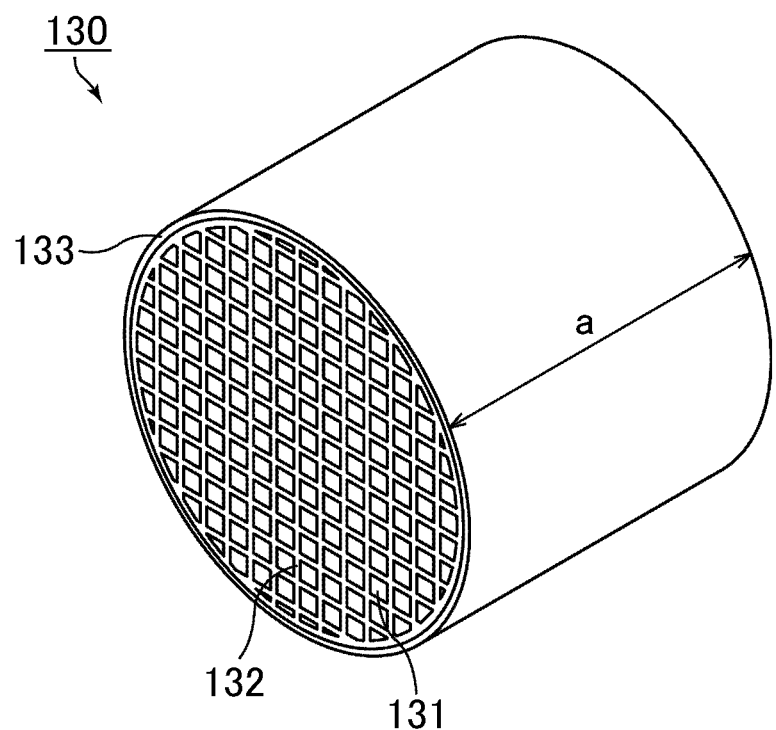
FIG. 6 is a perspective view schematically showing an example of an exhaust gas-treating body forming the exhaust gas purifying apparatus according to the first embodiment of the present invention.

FIG. 6 is a perspective view schematically showing an example of an exhaust gas-treating body forming the exhaust gas purifying apparatus according to the first embodiment of the present invention.

FIG. 6 illustrates a catalyst carrier as an example of the exhaust gas-treating body.

The exhaust gas-treating body 130 shown in FIG. 6 mainly includes a porous ceramic material and has a substantially round pillar-shape. Moreover, a coat layer 133 is formed on the outer periphery of the exhaust gas-treating body 130 so as to reinforce the outer peripheral portion of the exhaust gas-treating body 130, to adjust the shape, and to improve the heat insulating property of the exhaust gas-treating body 130. The coat layer may be formed, if necessary.

The exhaust gas-treating body 130 shown in FIG. 6 is a honeycomb structure in which a large number of through holes 131 are placed in parallel with one another in the longitudinal direction (in FIG. 6, a direction indicated by a double-headed arrow "a"), with a separation wall 132 interposed therebetween.

In the exhaust gas-treating body 130, a catalyst for converting toxic gas components such as CO, HC, and NOx contained in exhaust gas is supported on the separation wall 132 of the honeycomb structure. Examples of the catalyst include platinum.

The following description will discuss the casing forming the exhaust gas purifying apparatus of the present embodiment.

Figure 7:
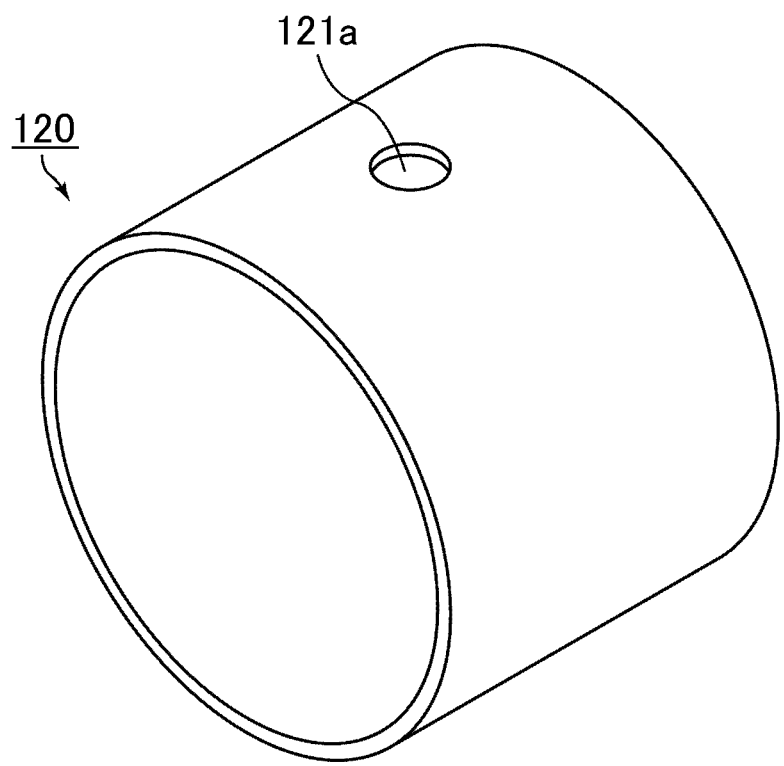
FIG. 7 is a perspective view schematically showing an example of a casing forming the exhaust gas purifying apparatus according to the first embodiment of the present invention.

FIG. 7 is a perspective view schematically showing an example of a casing forming the exhaust gas purifying apparatus according to the first embodiment of the present invention. The casing 120 shown in FIG. 7 is mainly made of metal such as stainless steel, and has an approximately cylindrical shape. The casing 120 has a hole 121a for allowing a sensor to penetrate therein.

The inner diameter of the casing 120 is made slightly shorter than a sum of the diameter of an end face of the exhaust gas-treating body 130 shown in FIG. 6 and the thickness of the holding sealing material wound around the exhaust gas-treating body 130.

Meanwhile, the length of the casing may be slightly longer than the longitudinal direction length of the exhaust gas-treating body and may approximately the same with the longitudinal direction length of the exhaust gas-treating body.

In the exhaust gas purifying apparatus 100 illustrated in FIG. 5A and FIG. 5B, the position of the penetration portion 114a in the holding sealing material 110 corresponds with the position of the hole 121a of the casing 120. The sensor 140a is disposed at the penetration portion 114a in the holding sealing material 110 and in the hole 121a of the casing 120.

The following description will discuss a sensor which forms the exhaust gas purifying apparatus of the present embodiment.

The kinds of the sensor in the exhaust gas purifying apparatus of the present embodiment are not particularly limited. Examples of the sensor include a temperature sensor for measuring the temperature of the exhaust gas purifying apparatus or the atmosphere, and an oxygen sensor.

The sensor may be used singly or in combination with a plurality of sensors as long as the sensor is disposed at the penetration portion of the holding sealing material.

The following description will discuss the method of manufacturing an exhaust gas purifying apparatus according to the first embodiment of the present invention with reference to the drawings.

FIG. 8A, FIG. 8B, FIG. 8C, and FIG. 8D each are a perspective view schematically showing an example of a method of manufacturing the exhaust gas purifying apparatus according to the first embodiment of the present invention.

FIG. 8A, FIG. 8B, FIG. 8C, and FIG. 8D illustrate a method of manufacturing the exhaust gas purifying apparatus 100 shown in FIG. 5A and FIG. 5B as an example of the method of manufacturing the exhaust gas purifying apparatus according to the first embodiment of the present invention.

Figure 8A:
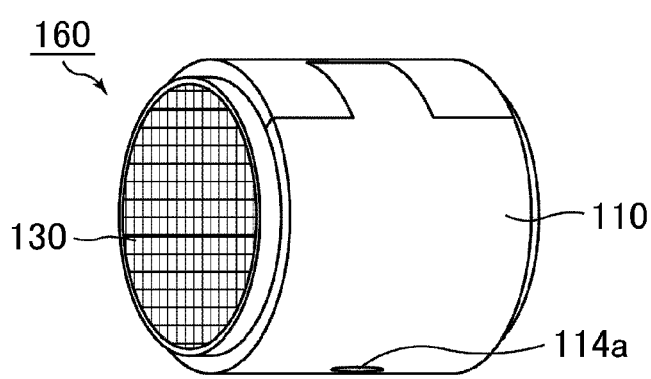
FIG. 8A, FIG. 8B, FIG. 8C, and FIG. 8D each are a perspective view schematically showing an example of a method of manufacturing an exhaust gas purifying apparatus according to the first embodiment of the present invention.

First, as shown in FIG. 8A, a winding step is performed by winding the holding sealing material 110 around the exhaust gas-treating body 130 to manufacture a wound body (exhaust gas-treating body with the holding sealing material wound therearound) 160.

The holding sealing material 10A shown in FIG. 2 is used as the holding sealing material 110. In FIG. 8A, the penetration portion 114a is formed in the holding sealing material 110.

Figure 8B:
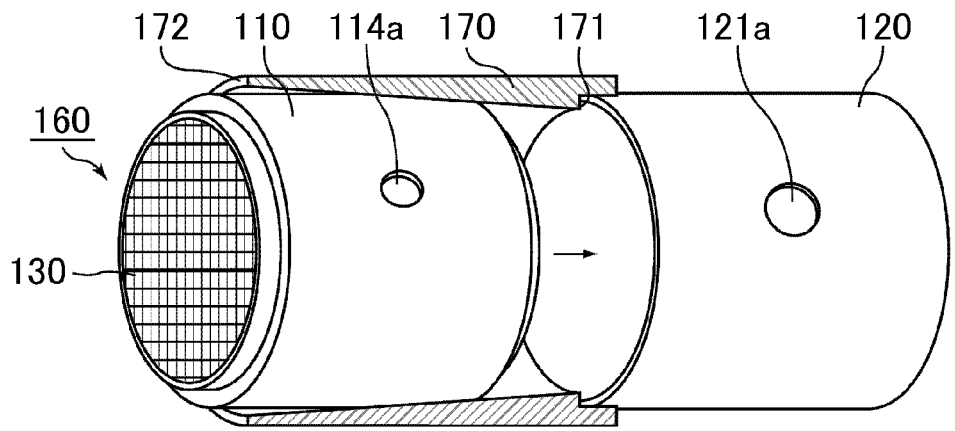

Next, as shown in FIG. 8B, a housing step is performed by housing the manufactured wound body 160 in the casing 120 having an approximately cylindrical shape.

Examples of the method for housing the wound body in the casing include a stuffing method (press-fitting method), a sizing method (swaging method), and a clam shell method.

In a stuffing method, the wound body is stuffed with a jig for stuffing and the like into a predetermined position in the casing. In a sizing method (swaging method), the wound body is inserted in the casing and is then compressed by applying pressures from the outer periphery side so as to reduce the inner diameter of the casing. In a clam shell method, the casing is made separable into two parts of a first casing and a second casing. The wound body is placed on the first casing and covered with the second casing to be sealed.

The stuffing method or sizing method (swaging method) is preferable among the methods for housing the wound body in the casing. This is because the stuffing method or sizing method (swaging methods) does not require two parts as casing, and therefore the number of manufacturing process tends to be reduced.

FIG. 8B illustrates a method for stuffing the wound body 160 into the casing 120 by using a stuffing jig 170.

The stuffing jig 170 has an approximately cylindrical shape as a whole, with its inside being expanded from one end to the other end in a tapered state.

One end of the stuffing jig 170 forms an end on a shorter diameter side 171 having an inner diameter corresponding to a diameter slightly smaller than the inner diameter of the casing 120. Moreover, the other end of the stuffing jig 170 forms an end on a longer diameter side 172 having at least an inner diameter corresponding to the outer diameter of the wound body 160.

By using the stuffing jig 170, the wound body 160 tends to be easily stuffed into the casing 120.

Meanwhile, the method for stuffing the wound body into the casing is not particularly limited, and, for example, a method may be used in which the wound body is stuffed into the casing by pushing the wound body with the hand.

Figure 8C:
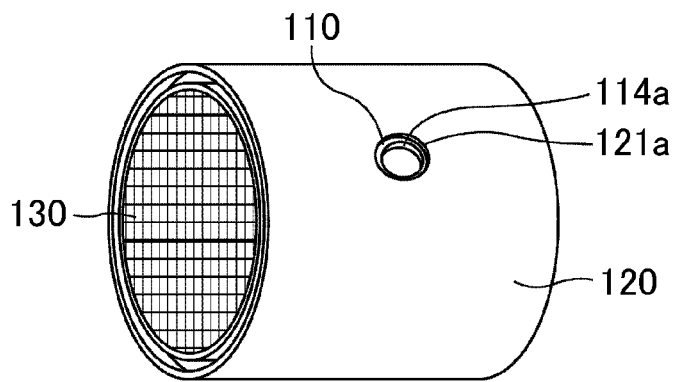

Next, as shown in FIG. 8C, position adjustment step is performed by adjusting the position of the penetration portion 114a formed in the holding sealing material 110 to the position of the hole 121a of the casing 120.

Examples of the method for adjusting the position of the penetration portion to the position of the hole of the casing include a method including rotation of the wound body housed in the casing.

In the above housing step, in the case of housing the wound body in the casing while adjusting the position of the penetration portion to match the position of the hole of the casing, the housing step and the position adjustment step tend to be simultaneously performed.

Subsequently, a disposing step (first disposing step) is performed for disposing a sensor to be connected to the exhaust gas-treating body, to pass through the holding sealing material, and to penetrate the casing.

Figure 8D:
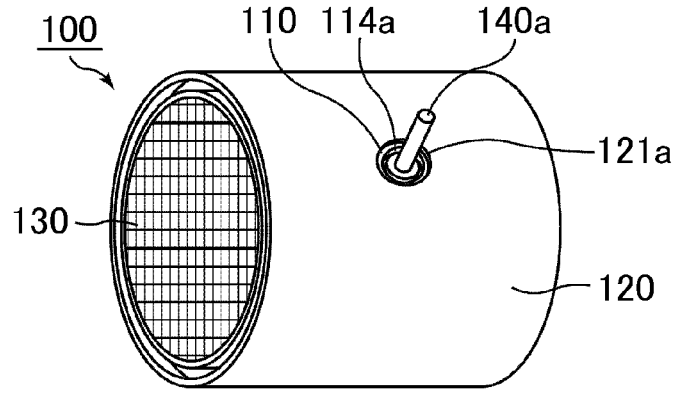

As shown in FIG. 8D, in the disposing step (first disposing step), the sensor 140a such as a temperature sensor is passed through the penetration portion 114a formed in the holding sealing material 110 and the hole 121a of the casing 120 so that the sensor 140a is connected to the exhaust gas-treating body 130.

The exhaust gas purifying apparatus 100 shown in FIG. 5A and FIG. 5B can be manufactured through the above process.

In the above method of manufacturing an exhaust gas purifying apparatus according to the present embodiment, the sensor is disposed at the penetration portion and the hole of the casing after housing the wound body in the casing.

In the case that a clam shell method is applied in the method of manufacturing an exhaust gas purifying apparatus according to the present embodiment, the wound body may be housed in the casing in a following manner. Namely, the wound body is placed on the first casing, and the sensor is disposed at the penetration portion, and then the second casing is covered thereon so that the sensor is allowed to pass through the hole formed in the second casing.

Moreover, in the method of manufacturing an exhaust gas purifying apparatus according to the present embodiment, if a clam shell method is applied, a sensor-attached wound body may be manufactured by firstly fixing the sensor at a predetermined position of the exhaust gas-treating body, passing the sensor through the penetration portion, and then winding the holding sealing material around the exhaust gas-treating body. In this case, after placing the sensor-attached wound body on the first casing, the wound body is covered with the second casing in a manner that the sensor pass through the hole formed in the second casing so that the wound body is housed in the casing.

The following description will list the effects obtained by the holding sealing material, the exhaust gas purifying apparatus, and the method of manufacturing an exhaust gas purifying apparatus of the present embodiment.

(1) The holding sealing material of the present embodiment has a penetration portion penetrating the holding sealing material in the thickness direction. Therefore, upon manufacturing an exhaust gas purifying apparatus including the holding sealing material of the present embodiment, a sensor tends to be disposed at the penetration portion of the holding sealing material.

(2) In the holding sealing material of the present embodiment, each of the first end face and the second end face of the holding sealing material is provided with a step formed by at least one projected portion.

In the case that each of the first end face and the second end face has a step, the projected portion allows easier fit of the holding sealing material. As a result, exhaust gas tends not to leak from the fitting portion of the holding sealing material, and thus the exhaust gas-sealing property tends to be maintained. Moreover, in the case that each of the first end face and the second end face of the holding sealing material has a step, the projected portion of the holding sealing material allows easier fit of the holding sealing material. As a result, even if the exhaust gas purifying apparatus receives a force in the width direction of the holding sealing material, displacement of the holding sealing material from the exhaust gas-treating body tends not to occur.

(3) The holding sealing material of the present embodiment is used in the exhaust gas purifying apparatus of the present embodiment and a method of manufacturing an exhaust gas purifying apparatus according to the present embodiment. Therefore, at least one of an electrode and a sensor tends to be disposed at the penetration portion formed in the holding sealing material.

(Second Embodiment)

The following description will discuss a second embodiment that is one of the embodiments of the present invention.

In the holding sealing material, the exhaust gas purifying apparatus, and the method of manufacturing an exhaust gas purifying apparatus according to the first embodiment of the present invention, one penetration portion is formed in the holding sealing material. In contrast, in the holding sealing material, the exhaust gas purifying apparatus, and the method of manufacturing an exhaust gas purifying apparatus according to the second embodiment of the present invention, two penetration portions are formed in the holding sealing material.

The following will discuss the holding sealing material according to the second embodiment of the present invention.

Figure 9:
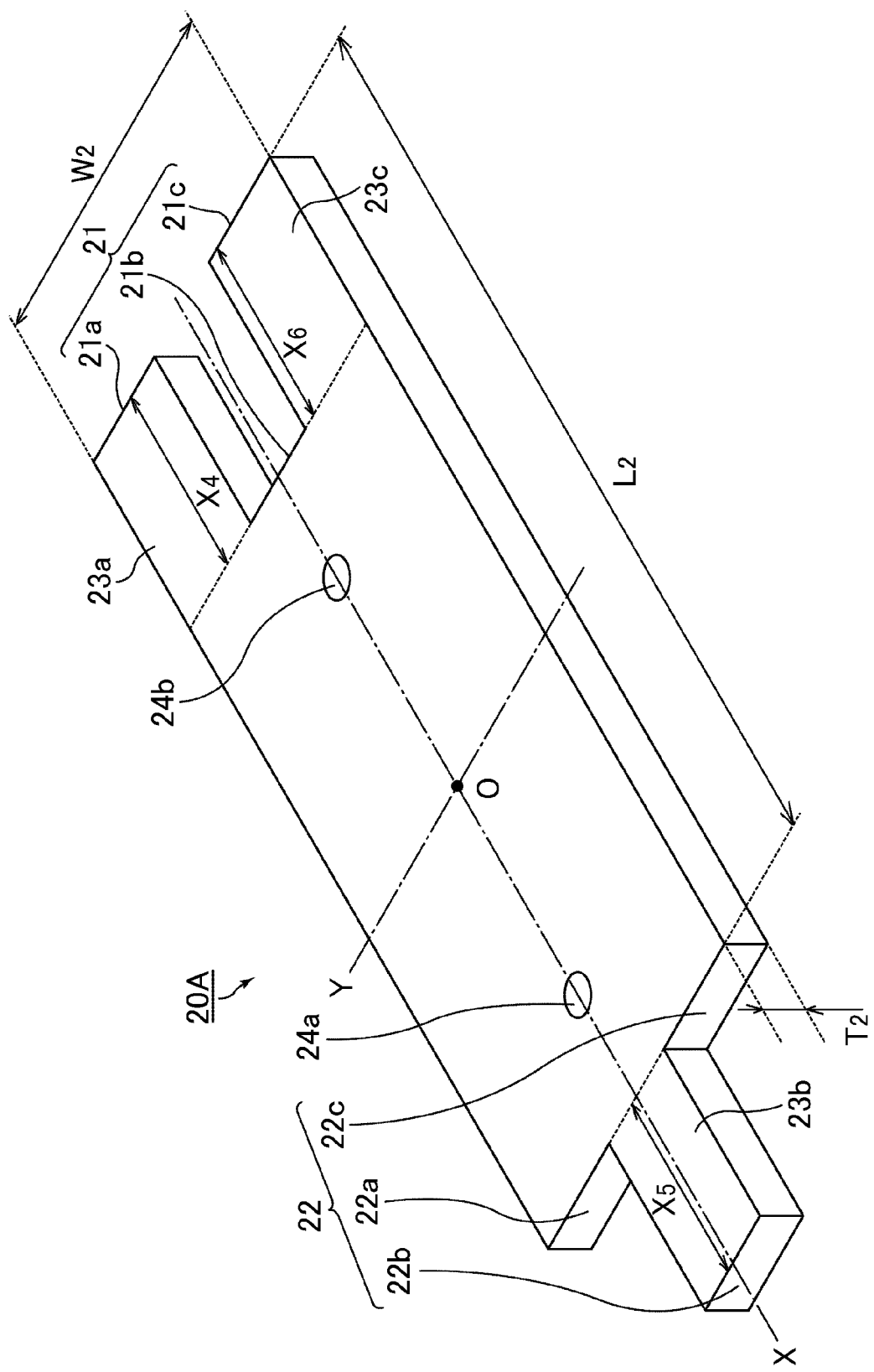
FIG. 9 is a perspective view schematically showing an example of a holding sealing material according to a second embodiment of the present invention.

FIG. 9 is a perspective view schematically showing an example of the holding sealing material according to the second embodiment of the present invention.

A holding sealing material 20A illustrated in FIG. 9 includes inorganic fibers such as alumina-silica fibers and has a mat shape. More specifically, the holding sealing material 20A has a plain plate shape with an approximately rectangular shape in a plain view having a predetermined length (shown by an arrow $L_2$ in FIG. 9), a predetermined width (shown by an arrow $W_2$ in FIG. 9), and a predetermined thickness (shown by an arrow $T_2$ in FIG. 9). Moreover, the holding sealing material 20A has first end face 21 (21a, 21b, and 21c) and second end face 22 (22a, 22b, and 22c) that are approximately parallel in the width $W_2$ direction of the holding sealing material 20A. Moreover, the holding sealing material 20A has two penetration portions 24a and 24b.

In the holding sealing material of the present embodiment, each of the first end face and the second end face has a step formed by at least one projected portion.

In the holding sealing material 20A shown in FIG. 9, two projected portions 23a and 23c are formed at the first end face 21, and one projected portion 23b is formed at the second end face 22. When the first end face 21 of the holding sealing material 20A is made in contact with the second end face 22 of the holding sealing material 20A, a convex formed by the projected portion 23b tends to engage with a concave formed by the projected portion 23a and the projected portion 23c.

As mentioned earlier, in the holding sealing material 20A shown in FIG. 9, each of the first end face 21 and the second end face 22 has three levels of steps.

In the holding sealing material of the present embodiment, preferably the lengths of the projected portions are approximately the same in the length direction of the holding sealing material. That is, preferably, the distance between the first end face and the second end face is approximately the same at any part of the holding sealing material.

In the holding sealing material 20A shown in FIG. 9, the length of the projected portion 23a (shown by an arrow $X_4$ in FIG. 9), the length of the projected portion 23b (shown by an arrow $X_5$ in FIG. 9), and the length of the projected portion 23c (shown by an arrow $X_6$ in FIG. 9) are approximately the same from one another in the length $L_2$ direction of the holding sealing material 20A. Therefore, the holding sealing material 20A shown in FIG. 9 has an approximately constant length $L_2$.

The holding sealing material of the present embodiment has two penetration portions formed therein. The two penetration portions in the holding sealing material are formed so as to penetrate the holding sealing material in the thickness direction.

In the holding sealing material of the present embodiment, positions of the penetration portions to be formed are not particularly limited; however, the penetration portions are preferably formed at positions other than the projected portions. This is because positions avoiding the projected portions tend to prevent deformation of the projected portions in the holding sealing material in the housing step for manufacturing the holding sealing material.

In the holding sealing material of the present embodiment, two penetration portions are formed preferably at positions approximately line-symmetrical with respect to a center line of the holding sealing material in the width direction, at positions approximately line-symmetrical with respect to a center line of the holding sealing material in the length direction, or at positions approximately point-symmetrical with respect to a center of the holding sealing material.

As used herein, the term "center line of the holding sealing material in the length direction" refers to a line (shown by a dashed line X in FIG. 9) dividing the width of the holding sealing material in approximately half. The term "center line of the holding sealing material in the width direction" refers to a line (shown by a dashed line Y in FIG. 9) dividing the length of the holding sealing material excluding the projected portions (the length $L_2$ minus $X_4$ or the length $L_2$ minus $X_6$ in FIG. 9) in approximately half. The term "center of the holding sealing material" refers to an intersection of the center line of the holding sealing material in the length direction and the center line of the holding sealing material in the width direction (shown by a point O in FIG. 9).

In the holding sealing material of the present embodiment, the two penetration portions are more preferably formed at positions approximately line-symmetrical with respect to the center line of the holding sealing material in the width direction. In this case, the distance between the two penetration portions in the holding sealing material is preferably about 50% the length of the holding sealing material.

If the two penetration portions in the holding sealing material are formed at positions approximately line-symmetrical with respect to the center line of the holding sealing material in the width direction, and also the distance between the two penetration portions in the holding sealing material is about 50% the length of the holding sealing material, manufacturing of an exhaust gas purifying apparatus using the holding sealing material provides a product in which the two penetration portions in the holding sealing material tend to face each other via the exhaust gas-treating body.

Meanwhile, the term "two penetration portions face each other" used herein refers to a condition that the two penetration portions in the holding sealing material wound around the exhaust gas treating body are positioned approximately line-symmetrical with respect to a center line of the exhaust gas-treating body in the length direction in a cross-section in approximately parallel with the length direction of the exhaust gas treating body, and also approximately point-symmetrical with respect to the center of the cross-section approximately perpendicular to the length direction of the exhaust gas treating body.

In the holding sealing material of the present embodiment, examples of the shape of the penetration portion of the holding sealing material include approximately round-pillar shape, approximately rectangular-pillar shape, approximately cylindroid shape, approximately truncated cone shape, and pillar shape having a bottom face surrounded by approximately straight line and approximately arc line. Examples of the cross-sectional shape of the penetration portion include approximately round shape, approximately polygonal shape such as approximately rectangular shape, approximately elliptical shape, approximately race track shape, and the like.

In the case of manufacturing an exhaust gas purifying apparatus using the holding sealing material of the present embodiment, the cross-sectional shape of the penetration portion of the holding sealing material tends to be matched with the cross-sectional shape of an electrode member and the like.

Here, two penetration portions are formed in the holding sealing material of the present embodiment. The shapes or the sizes of the penetration portion may be approximately the same or may be different from one another.

In the holding sealing material of the present embodiment, the diameter of the cross section of the penetration portion of the holding sealing material is preferably from about 1 mm to about 100 mm and more preferably from about 20 mm to about 40 mm.

If the diameter of the cross section of the penetration portion of the holding sealing material is about 1 mm or more, at least one of an electrode member and a sensor is more likely to be disposed at the penetration portion of the holding sealing material when the holding sealing material is used in the exhaust gas purifying apparatus. If the diameter of the cross section of the penetration portion of the holding sealing material is about 100 mm or less, the area of the holding sealing material becomes not too small, which tends not to deteriorate the holding power of the holding sealing material. Moreover, if the diameter of the cross section of the penetration portion is about 100 mm or less, the area of the holding sealing material in its width direction tends not to decrease, which tends not to deteriorate the tensile strength of the holding sealing material.

Moreover, in the holding sealing material of the present embodiment, the cross-sectional area of the penetration portion of the holding sealing material is preferably from about 1 $mm^2$ to about 10000 $mm^2$, and more preferably from about 400 $mm^2$ to about 1600 $mm^2$.

If the cross-sectional area of the penetration portion of the holding sealing material is about 1 $mm^2$ or more, a sufficient area for disposing at least one of an electrode member and a sensor tends to be secured in use of the holding sealing material in the exhaust gas purifying apparatus. If the cross-sectional area of the penetration portion of the holding sealing material is about 10000 $mm^2$ or less, the area of the holding sealing material becomes not too small, which tends not to deteriorate the holding power of the holding sealing material.

In the holding sealing material 20A shown in FIG. 9, shapes of the two penetration portions 24a and 24b are both approximately a round-pillar shape. The shapes of the cross-section of the two penetration portions 24a and 24b are both approximately a round shape.

The penetration portions 24a and 24b of the holding sealing material may be referred to as being formed at positions approximately line-symmetrical with respect to the center line of the holding sealing material in the width direction, or may be referred to as being formed at positions approximately point-symmetrical with respect to the center of the holding sealing material.

FIG. 10A, FIG. 10B, FIG. 10C, FIG. 10D, and FIG. 10E each are a plain view schematically showing one of other examples of the holding sealing material according to the second embodiment of the present invention.

In each of FIG. 10A, FIG. 10B, FIG. 10C, FIG. 10D, and FIG. 10E, the two penetration portions formed in the holding sealing material may be referred to as being formed at positions approximately line symmetrical with respect to the center line of the holding sealing material in the width direction, or may be referred to as being formed at positions approximately point-symmetrical with respect to the center of the holding sealing material. Moreover, the diameter of a cross section of the penetration portions or the shape of a cross section of the penetration portions formed in the holding sealing material are respectively different from one another.

Figure 10A:
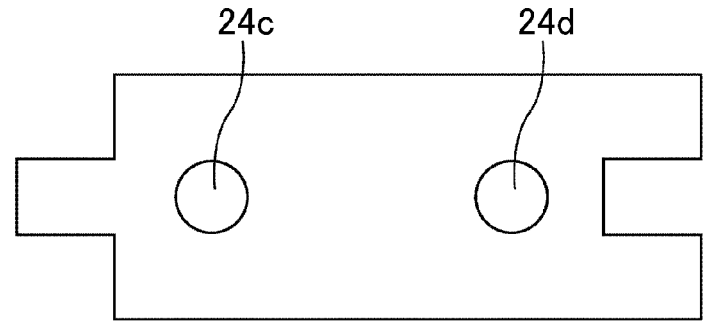
FIG. 10A, FIG. 10B, FIG. 10C, FIG. 10D, and FIG. 10E each are a plain view schematically showing one of other examples of the holding sealing material according to the second embodiment of the present invention.

In the holding sealing material 20B shown in FIG. 10A, the cross-sectional shapes of penetration portions 24c and 24d are both approximately a round shape, similarly to the cross-sectional shapes of the penetration portions 24a and 24b of the holding sealing material 20A shown in FIG. 9. The diameters of the cross sections of the penetration portions 24c and 24d of the holding sealing material 20B shown in FIG. 10A are larger than the diameters of the cross sections of the penetration portions 24a and 24b of the holding sealing material 20A shown in FIG. 9.

Figure 10B:
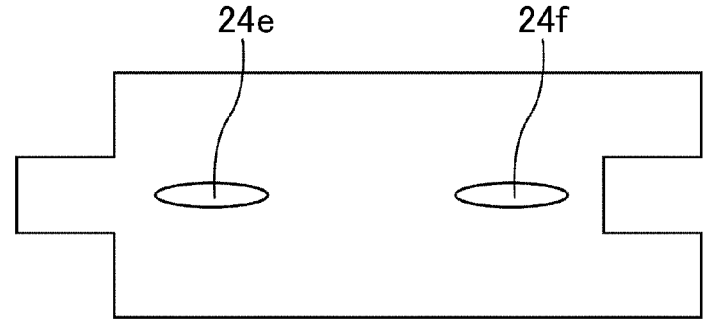
Figure 10C:
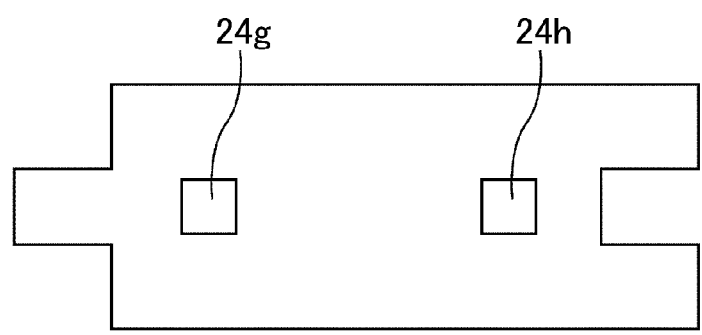
Figure 10D:
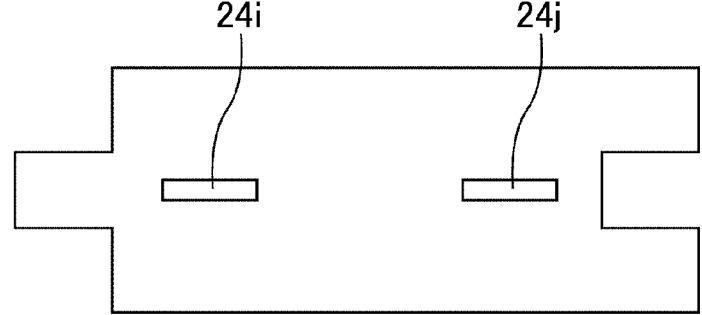

In a holding sealing material 20C shown in FIG. 10B, a holding sealing material 20D shown in FIG. 10C and a holding sealing material 20E shown in FIG. 10D, the cross-sectional shapes of penetration portions 24e and 24f, penetration portions 24g and 24h, and penetration portions 24i and 24j are an approximately elliptical shape, an approximately square shape, and an approximately rectangular shape, respectively, and are different from the cross-sectional shape of the penetration portions 24a and 24b of the holding sealing material 20A shown in FIG. 9.

Figure 10E:
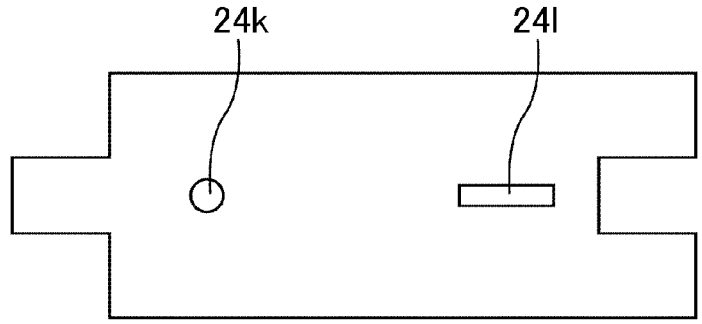

In the holding sealing material 20F shown in FIG. 10E, the cross-sectional shape of a penetration portion 24k is an approximately round shape, and the cross-sectional shape of a penetration portion 24l is an approximately rectangular shape. In the case that an exhaust gas purifying apparatus is manufactured by using the holding sealing material 20F shown in FIG. 10E and a casing having two holes with approximately the same size, the positions of the holes of the casing and the positions of the penetration portions are more likely to be easily adjusted. This is because, if the position of the first hole of the casing is adjusted to the position of the penetration portion 24k, then the position of the second hole of the casing can be adjusted simply by locating the hole to a position corresponding to a part of the penetration portion 24l. Namely, since the position of the second hole of the casing needs not to be strictly adjusted, the positions of the holes of the casing and the positions of the penetrations are more likely to be easily adjusted.

FIG. 11A, FIG. 11B, FIG. 11C, FIG. 11D, and FIG. 11E each are a plain view schematically showing still one of other examples of the holding sealing material according to the second embodiment of the present invention.

In each of FIG. 11A, FIG. 11B, FIG. 11C, FIG. 11D, and FIG. 11E, the two penetration portions formed in the holding sealing material may be referred to as being formed at positions approximately line symmetrical with respect to the center line of the holding sealing material in the length direction, or may be referred to as being formed at positions approximately point-symmetrical with respect to the center of the holding sealing material. The diameter of a cross section of the penetration portions or the shape of across section of the penetration portions formed in the holding sealing material are respectively different from one another.

Figure 11A:
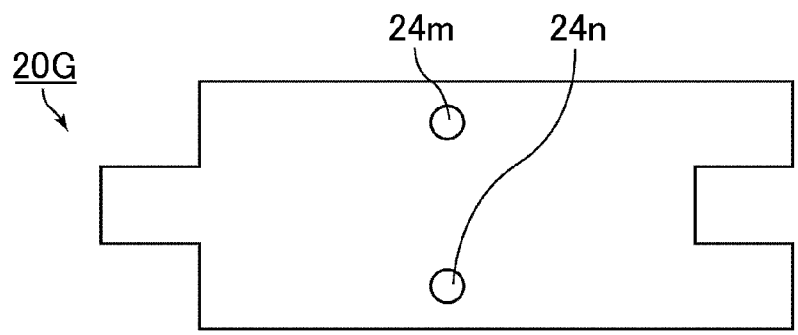
FIG. 11A, FIG. 11B, FIG. 11C, FIG. 11D and FIG. 11E each are a plain view schematically showing still one of other examples of the holding sealing material according to the second embodiment of the present invention.

In a holding sealing material 20G shown in FIG. 11A, the cross-sectional shapes of penetration portions 24m and 24n are both an approximately round shape.

Figure 11B:
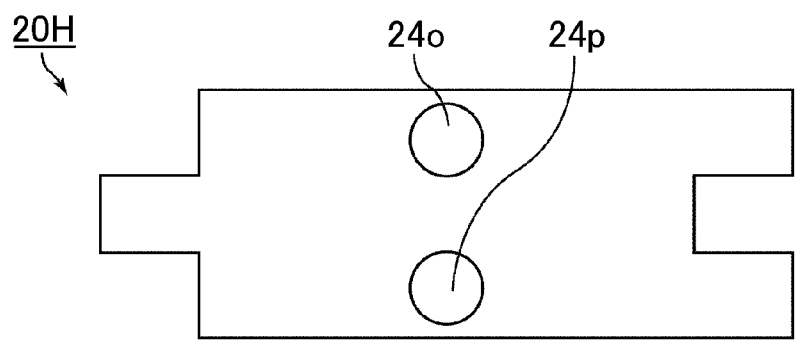

In a holding sealing material 20H shown in FIG. 11B, the cross-sectional shapes of penetration portions 24o and 24p are both approximately a round shape, similarly to the cross-sectional shapes of the penetration portions 24m and 24n of the holding sealing material 20G shown in FIG. 11A. The diameters of the cross-sections of the penetration portions 24o and 24p of the holding sealing material 20H shown in FIG. 11B are larger than the diameters of the cross-sections of the penetration portions 24m and 24n of the holding sealing material 20G shown in FIG. 11A.

Figure 11C:
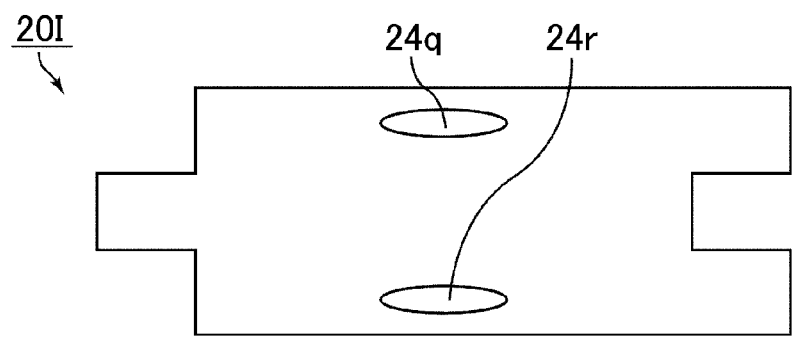
Figure 11D:
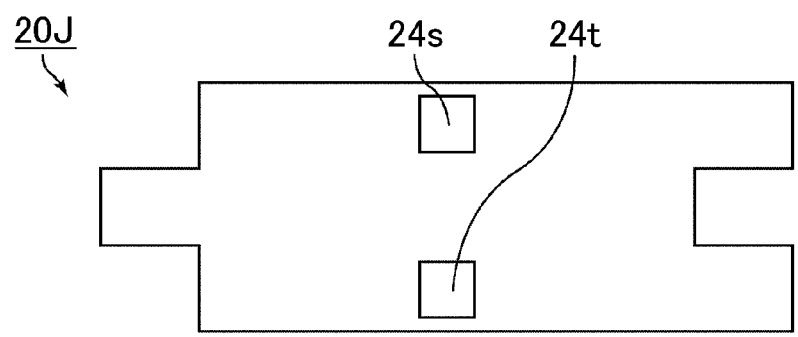
Figure 11E:
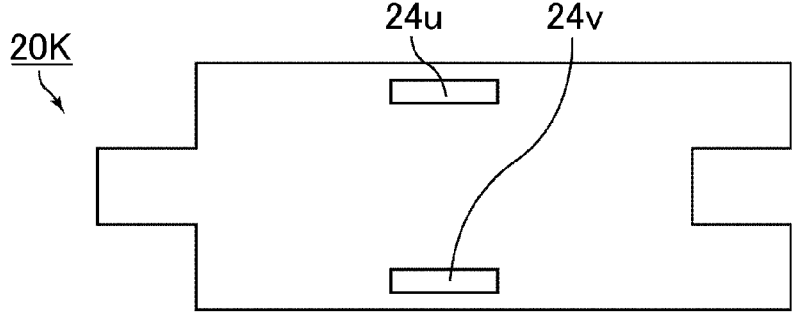

In a holding sealing material 20I show in FIG. 11C, a holding sealing material 20J shown in FIG. 11D, and a holding sealing material 20K shown in FIG. 11E, the cross-sectional shapes of penetration portions 24q and 24r, penetration portions of 24s and 24t, and penetration portions of 24u and 24v are an approximately elliptical shape, an approximately square shape, and an approximately rectangular shape, respectively, and they are different from the cross-sectional shapes of the penetration portions 24m and 24n of the holding sealing material 20G shown in FIG. 11A.

The holding sealing material of the present embodiment may be provided with a binder such as organic binders. The holding sealing material of the present embodiment may be a needle mat obtained by needling a base mat formed of inorganic fibers.

The method of manufacturing the holding sealing material according to the present embodiment is almost the same as that of the holding sealing material according to the first embodiment of the present invention except that the number of the penetration portion formed in the holding sealing material is different.

Next, an exhaust gas purifying apparatus according to the second embodiment of the present invention will be described.

Figure 12A:
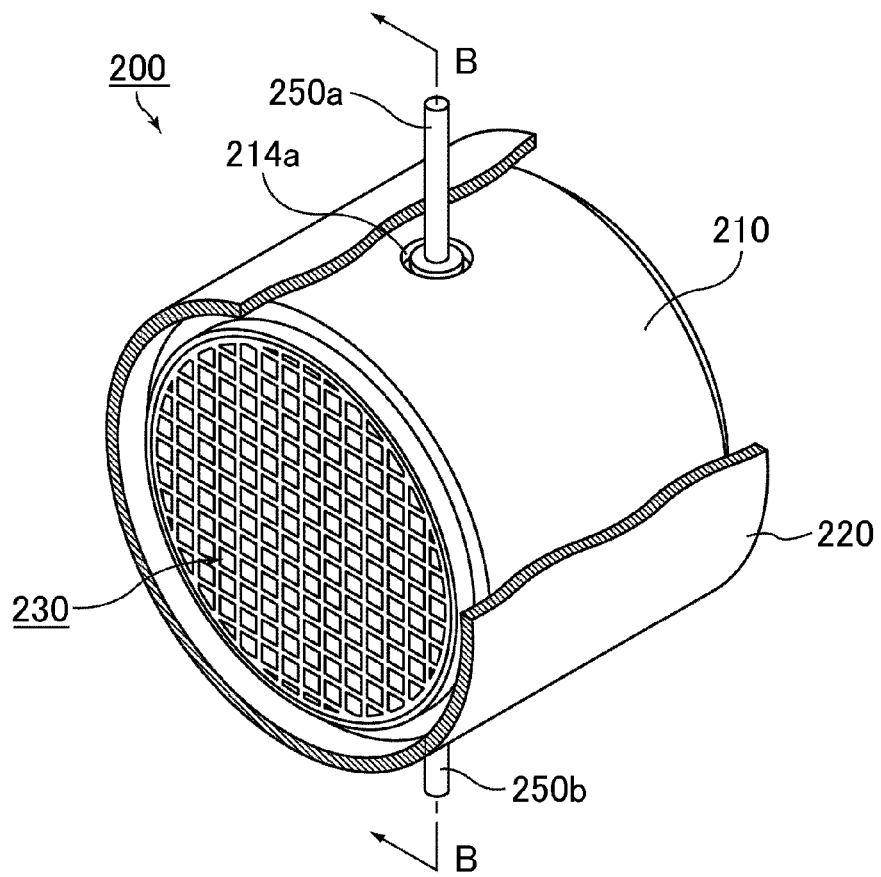
FIG. 12A is a perspective cross-sectional cutaway view schematically showing an example of an exhaust gas purifying apparatus according to the second embodiment of the present invention.
Figure 12B:
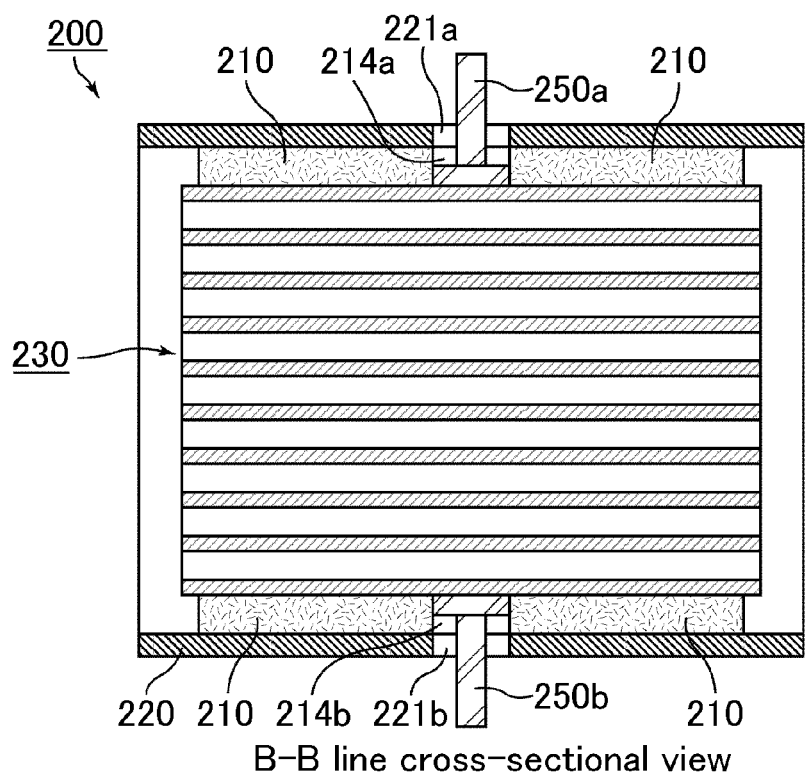
FIG. 12B is a B-B line cross-sectional view of the exhaust gas purifying apparatus shown in FIG. 12A.

FIG. 12A is a perspective cross-sectional cutaway view schematically showing an example of an exhaust gas purifying apparatus according to the fourth embodiment of the present invention. FIG. 12B is a B-B line cross-sectional view of the exhaust gas purifying apparatus shown in FIG. 12A.

An exhaust gas purifying apparatus 200 shown in FIG. 12A and FIG. 12B includes a casing 220, an exhaust gas-treating body 230 housed in the casing 220, and a holding sealing material 210 disposed between the exhaust gas-treating body 230 and the casing 220.

The exhaust gas purifying apparatus 200 further includes electrode members 250a and 250b which are connected to the exhaust gas-treating body 230, pass through the holding sealing material 210, and penetrate the casing 220. The electrode member 250a is an electrode member on the positive side and the electrode member 250b is an electrode member on the negative side.

The holding sealing material 210 is wound around the exhaust gas-treating body 230. The exhaust gas-treating body 230 is held by the holding sealing material 210.

An inlet pipe for introducing exhaust gas discharged from the internal combustion engine and an exhaust pipe for discharging the exhaust gas having passed through the exhaust gas-treating body to the outside are connected to ends of the casing 220, if necessary.

The exhaust gas purifying apparatus of the present embodiment tends to be used as an electrically heated catalyst converter.

In the exhaust gas purifying apparatus 200 shown in FIG. 12A and FIG. 12B, application of a predetermined voltage between the electrode member 250a on the positive side and the electrode member 250b on the negative side powers the exhaust gas-treating body 230 existing between the electrode member 250a on the positive side and the electrode member 250b on the negative side. As a result, the exhaust gas-treating body 230 generates heat.

The generated heat heats a catalyst supported on the exhaust gas-treating body 230 so that the catalyst is activated. As a result, oxidation and reduction reactions of toxic gas components such as CO, HC, and NOx contained in the exhaust gas proceed, converting the toxic gas components.

The following description will discuss the holding sealing material forming the exhaust gas purifying apparatus of the present embodiment.

The exhaust gas purifying apparatus of the present embodiment uses the holding sealing material of the present embodiment.

FIG. 12A and FIG. 12B show an example of an exhaust gas purifying apparatus 200 in which the holding sealing material 20A illustrated in FIG. 9 is used as the holding sealing material 210.

As shown in FIG. 12A and FIG. 12B, penetration portions 214a and 214b are formed in the holding sealing material 210 which is wound around an exhaust gas-treating body 230. In the exhaust gas purifying apparatus 200 shown in FIG. 12A and FIG. 12B, a positive-side electrode member 250a is disposed at the penetration portion 214a of the holding sealing material, and a negative-side electrode member 250b is disposed at the penetration portion 214b of the holding sealing material.

Meanwhile, the positive-side electrode member or the negative-side electrode member may be disposed at either of the penetration portions of the holding sealing material in the exhaust gas purifying apparatus of the present embodiment.

In the exhaust gas purifying apparatus of the present embodiment, the first end face and the second end face of the holding sealing material may contact each other without a gap or may form a gap of a predetermined size.

In the case that a gap is formed between the first end face and the second end face of the holding sealing material, at least one of an electrode member and a sensor tends to be disposed at the gap. In the case that a gap is formed between the first end face and the second end face of the holding sealing material, the distance between the first end face and the second end face of the holding sealing material is preferably about 100 mm or less, more preferably from about 20 mm to about 100 mm, and further preferably from about 20 mm to about 40 mm. If the distance between the first end face and the second end face of the holding sealing material is about 100 mm or less, the area of the holding sealing material contacting the exhaust gas-treating body tends not to decrease. Thus, the holding sealing material tends to easily hold the exhaust gas-treating body. If the distance between the first end face and the second end face of the holding sealing material is about 20 mm or more, since the gap is not too small, at least one of an electrode member and a sensor tends to be easily disposed at the gap.

The exhaust gas-treating body explained in the first embodiment of the present invention may be used as the exhaust gas-treating body forming the exhaust gas purifying apparatus of the present embodiment.

The following description will discuss the casing forming the exhaust gas purifying apparatus of the present embodiment.

Figure 13:
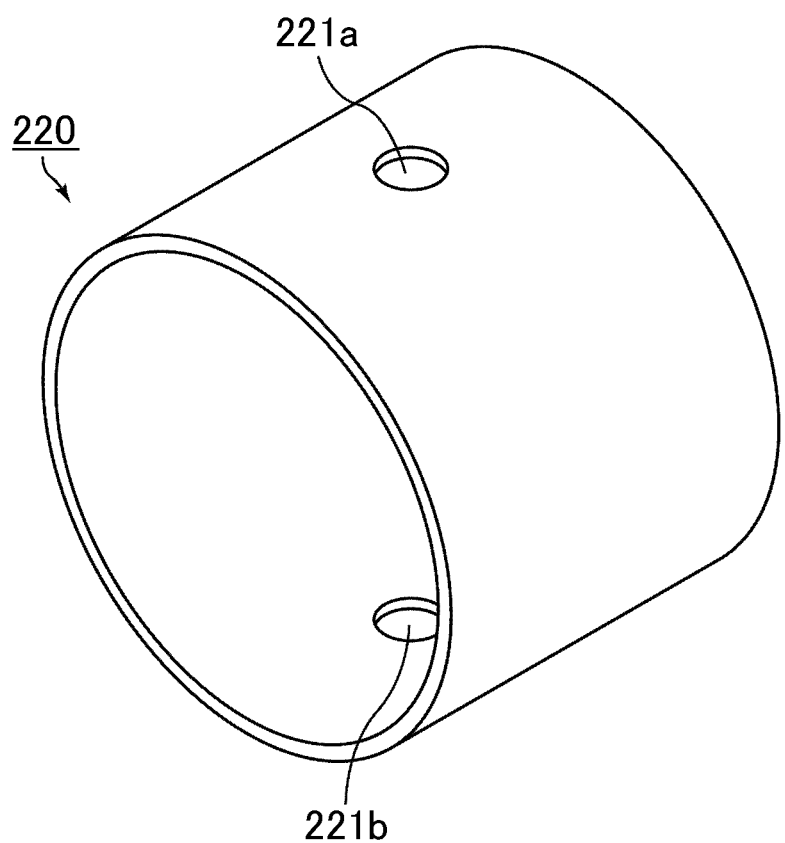
FIG. 13 is a perspective view schematically showing an example of a casing forming the exhaust gas purifying apparatus according to the second embodiment of the present invention.

FIG. 13 is a perspective view schematically showing an example of a casing forming the exhaust gas purifying apparatus according to the second embodiment of the present invention. The casing 220 shown in FIG. 13 is mainly made of metal such as stainless steel, and has a substantially cylindrical shape. The casing 220 has holes 221a and 221b for allowing an electrode member to penetrate therethrough.

The inner diameter of the casing 220 is made slightly shorter than a sum of the diameter of an end face of the exhaust gas-treating body and the thickness of the holding sealing material wound around the exhaust gas-treating body.

Meanwhile, the length of the casing may be slightly longer than the longitudinal direction length of the exhaust gas-treating body or may be approximately the same with the longitudinal direction length of the exhaust gas-treating body.

In the exhaust gas purifying apparatus 200 illustrated in FIG. 12A and FIG. 12B, the position of the penetration portion 214a formed in the holding sealing material 210 corresponds with the position of the hole 221a in the casing 220. The position of the penetration portion 214b in the holding sealing material 210 corresponds with the position of the hole 221b in the casing 220. The positive-side electrode member 250a is disposed at the penetration portion 214a of the holding sealing material 210 and the hole 221a of the casing 220.

The negative-side electrode 250b is disposed at the penetration portion 214b of the holding sealing material 210 and the hole 221b of the casing 220.

The following will discuss the electrode member forming the exhaust gas purifying apparatus of the present embodiment.

The electrode member is connected with a battery power supply. Voltage is directly applied from the battery power supply to the electrode member. Accordingly, the exhaust gas-treating body connected with the electrode member tends to be charged with a current.

The position to dispose the electrode member is not particularly limited. Taking an efficient heating of the exhaust gas-treating body into consideration, the electrode members are preferably disposed at positions where the positive-side electrode member and the negative-side electrode member stand opposite one another.

In the exhaust gas purifying apparatus of the present embodiment, a sensor such as a temperature sensor and an oxygen sensor may be disposed at each of the two penetration portions of the holding sealing material instead of disposing electrode members, as in the same manner as the exhaust gas purifying apparatus according to the first embodiment of the present invention.

The following will discuss a method of manufacturing an exhaust gas purifying apparatus according to the second embodiment of the present invention with reference to the drawings.

FIG. 14A, FIG. 14B, FIG. 14C, and FIG. 14D each are a perspective view schematically showing an example of a method of manufacturing the exhaust gas purifying apparatus according to the second embodiment of the present invention.

FIG. 14A, FIG. 14B, FIG. 14C, and FIG. 14D illustrate a method of manufacturing the exhaust gas purifying apparatus 200 shown in FIG. 12A and FIG. 12B as an example of the method of manufacturing the exhaust gas purifying apparatus according to the second embodiment of the present invention.

Figure 14A:
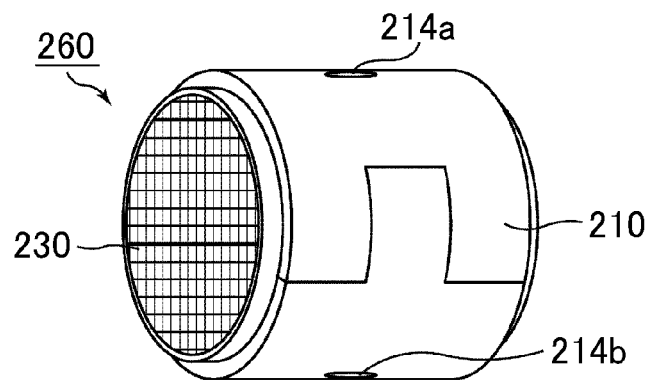
FIG. 14A, FIG. 14B, FIG. 14C, and FIG. 14D each are a perspective view schematically showing an example of a method of manufacturing an exhaust gas purifying apparatus according to the second embodiment of the present invention.

First, as shown in FIG. 14A, winding step is performed by winding the holding sealing material 210 around the exhaust gas-treating body 230 to manufacture a wound body (exhaust gas-treating body with the holding sealing material wound therearound) 260.

The holding sealing material 20A illustrated in FIG. 9 is used as the holding sealing material 210. In FIG. 14A, the penetration portions 214a and 214b are formed in the holding sealing material 210.

Figure 14B:
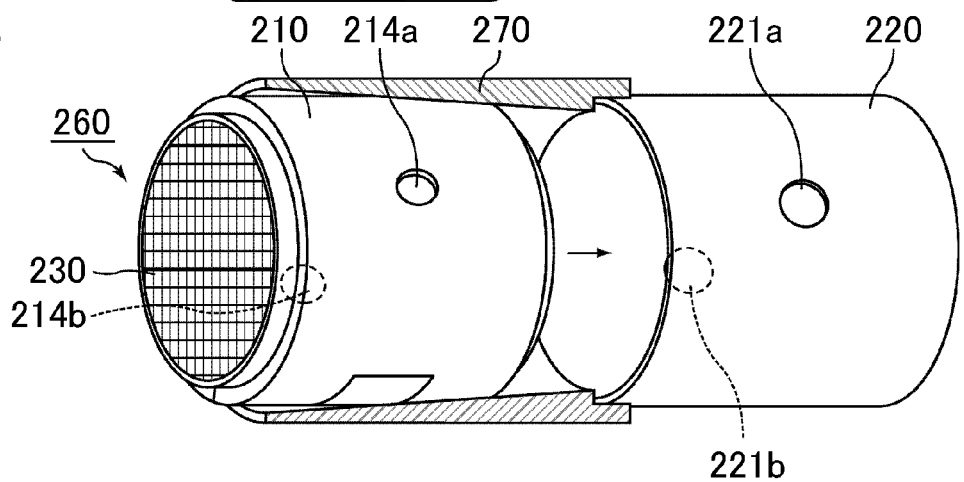

Next, as shown in FIG. 14B, housing step is performed by housing the manufactured wound body 260 in the casing 220 having an approximately cylindrical shape.

Examples of the method for housing the wound body in the casing include a stuffing method (press-fitting method), a sizing method (swaging method), and a clam shell method, which are explained in the first embodiment of the present invention.

A stuffing method or a sizing method (swaging method) is preferable among the methods for housing the wound body in the casing. This is because a stuffing method or a sizing method (swaging method) does not require two parts as casing, and therefore the number of manufacturing process tends to be reduced.

FIG. 14B illustrates a method for stuffing the wound body 260 in the casing 220 with a stuffing jig 270.

The stuffing jig 270 has a similar structure as that of the stuffing jig 170 explained in the first embodiment of the present invention.

The method for stuffing the wound body in the casing is not particularly limited, and may be a method including stuffing the wound body by pushing the wound body with hands into the casing, and the like.

Figure 14C:
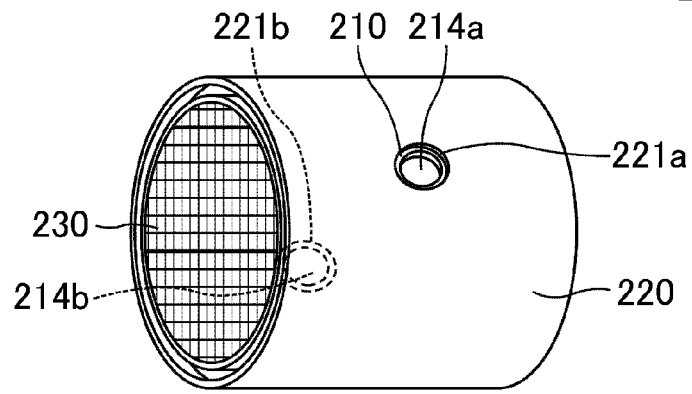

Thereafter, as shown in FIG. 14C, position adjustment step is performed by adjusting the position of the penetration portions 214a and 214b formed in the holding sealing material 210 to the positions of the holes 221a and 221b, respectively, of the casing 220.

As the method for adjusting the position of the penetration portion to the positions of the holes of the casing, a method including rotation of the wound body housed in the casing, and the like can be exemplified.

In the above housing step, in the case of housing the wound body in the casing while adjusting the positions of the penetration portion to match the position of the hole of the casing, the housing step and the position adjustment step are more likely to be performed simultaneously.

Thereafter, the first disposing step is performed by disposing an electrode member in a manner that it connects to the exhaust gas-treating body, passes through the holding sealing material, and penetrates the casing. Also, the second disposing step is performed by disposing another electrode member in a manner that it connects to the exhaust gas-treating body, passes through the holding sealing material, and penetrates the casing.

Figure 14D:
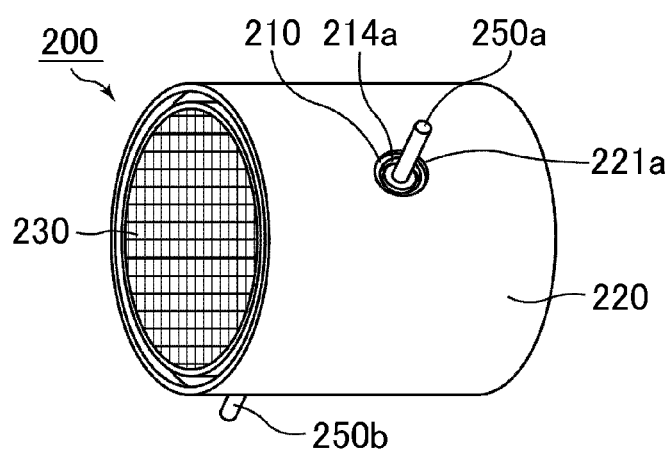

As shown in FIG. 14D, in the first disposing step, the positive-side electrode member 250a is allowed to pass through the hole 221a which is one of the holes formed in the casing 220 and the penetration portion 214a formed in the holding sealing material 210 so that the positive-side electrode member 250a is connected to the exhaust gas-treating body 230. In the second disposing step, the negative-side electrode member 250b is allowed to pass through the other hole 221b formed in the casing 220 and the penetration portion 214b formed in the holding sealing material 210 so that the negative-side electrode member 250b is connected to the exhaust gas-treating body 230.

Either the first disposing step or the second disposing step may be performed first as long as the disposing steps are performed after the position adjustment step (after the housing step if the housing step and the position adjustment step are simultaneously performed).

Through the above process, the exhaust gas purifying apparatus 200 shown in FIG. 12A and FIG. 12B can be manufactured.

In the aforementioned method of manufacturing an exhaust gas purifying apparatus according to the present embodiment, two electrode members are disposed at different penetration portions and holes of the casing, after housing the wound body in the casing.

In the method of manufacturing an exhaust gas purifying apparatus according to the present embodiment, if a clam shell method is applied, the wound body may be housed in the casing in a following manner. Namely, the wound body is placed on the first casing having a hole in a manner that the position of one of the penetration portions of the holding sealing material corresponds to the hole of the first casing; the positive-side electrode member is disposed at the other penetration portion; the negative-side electrode member is disposed at one of the penetration portions of the holding sealing material and the hole of the first casing; and then the second casing is placed on top, with the positive-side electrode member passing through the hole formed in the second casing.

Moreover, in the method of manufacturing an exhaust gas purifying apparatus according to the present embodiment, if a clam shell method is applied, an electrode-attached wound body may be manufactured as follows. Namely, an electrode-attached body is prepared by firstly fixing the positive-side electrode member and the negative-side electrode member to predetermined positions of the exhaust gas-treating body, allowing the negative-side electrode member to pass through one of the penetration portions of the holding sealing material; and then winding the holding sealing material around the exhaust gas-treating body in a manner that that the positive electrode member is passed through the other penetration portion of the holding sealing material. In this case, after placing the electrode-attached wound body on the first casing having a hole in a manner to allow the negative-side electrode member to pass through the hole, the second casing is placed on top in a manner allowing the positive-side electrode member to pass through the hole formed in the second casing so that the wound body is housed in the casing.

In the present embodiment, not only the effects (1) to (3) explained in the first embodiment of the present invention but also the following effect can be exerted.

(4) An electrode member tends to be disposed at the exhaust gas purifying apparatus according to the present embodiment, and thus the exhaust gas purifying apparatus according to the present embodiment tends to be used as an electrically heated catalytic converter.

(Third Embodiment)

The following description will discuss a third embodiment that is one of the embodiments of the present invention.

In the holding sealing material, the exhaust gas purifying apparatus, and the method of manufacturing an exhaust gas purifying apparatus according to the first embodiment of the present invention, one penetration portion is formed in the holding sealing material. In the holding sealing material, the exhaust gas purifying apparatus, and the method of manufacturing an exhaust gas purifying apparatus according to the second embodiment of the present invention, two penetration portions are formed in the holding sealing material. Here, in the holding sealing material, the exhaust gas purifying apparatus, and the method of manufacturing an exhaust gas purifying apparatus according to the third embodiment of the present invention, three penetration portions are formed in the holding sealing material.

The following description will discuss the holding sealing material according to the third embodiment of the present invention.

The holding sealing material according to the third embodiment of the present invention has a similar structure as that of the holding sealing material according to the first embodiment or the second embodiment of the present invention, except that three penetration portions are formed in the present embodiment.

The holding sealing material of the present embodiment has three penetration portions. The three penetration portions of the holding sealing material are formed such that they penetrate the holding sealing material in the thickness direction of the holding sealing material.

In the holding sealing material of the present embodiment, the positions of the penetration portions formed are not particularly limited but are preferably at positions other than the projected portions.

In the holding sealing material of the present embodiment, a pair of the penetration portions among the three penetration portions are preferably formed at positions approximately line-symmetrical with respect to a center line of the holding sealing material in the width direction, at positions approximately line-symmetrical with respect to a center line of the holding sealing material in the length direction, or at positions approximately point-symmetrical with respect to the center of the holding sealing material.

In the holding sealing material of the present embodiment, a pair of the penetration portions among the three penetration portions are more preferably formed at positions approximately line-symmetrical with respect to the center line of the holding sealing material in the width direction. In this case, the distance between the pair of the penetration portions in the holding sealing material is preferably about 50% the length of the holding sealing material.

If a pair of the penetration portions among the three penetration portions in the holding sealing material are formed at positions approximately line-symmetrical with respect to the center line of the holding sealing material in the width direction, and also the distance between the pair of the penetration portions is about 50% the length of the holding sealing material, manufacturing of an exhaust gas purifying apparatus using the holding sealing material provides a product in which the pair of the penetration portions tend to face each other via the exhaust gas-treating body.

The shapes of the penetration portions explained in the second embodiment of the present invention may be exemplified for the shapes and the cross-sectional shapes of the penetration portions of the holing sealing material of the present embodiment.

In the holding sealing material of the present embodiment, three penetration portions are formed. The shape and the size of the three penetration portions may be approximately the same or may be different from one another.

In the holding sealing material of the present embodiment, the diameter of the cross section of the penetration portion of the holding sealing material is preferably from about 1 mm to about 100 mm and more preferably from about 20 mm to about 40 mm.

If the diameter of the cross section of the penetration portion of the holding sealing material is about 1 mm or more, at least one of an electrode member and a sensor is more likely to be disposed at the penetration portion of the holding sealing material when the holding sealing material is used in the exhaust gas purifying apparatus. If the diameter of the cross section of the penetration portion of the holding sealing material is about 100 mm or less, the area of the holding sealing material becomes not too small, which tends not to deteriorate the holding power of the holding sealing material. Moreover, if the diameter of the cross section of the penetration portion of the holding sealing material is about 100 mm or less, the area of the holding sealing material in its width direction tends not to decrease, which tends not to deteriorate the tensile strength of the holding sealing material.

Moreover, in the holding sealing material of the present embodiment, the cross-sectional area of the penetration portion of the holding sealing material is preferably from about 1 $mm^2$ to about 10000 $mm^2$, and more preferably from about 400 $mm^2$ to about 1600 $mm^2$.

If the cross-sectional area of the penetration portion of the holding sealing material is about 1 $mm^2$ or more, a sufficient area for disposing at least one of an electrode member and a sensor tends to be secured in use of the holding sealing material in the exhaust gas purifying apparatus. If the cross-sectional area of the penetration portion of the holding sealing material is about 10000 $mm^2$ or less, the area of the holding sealing material becomes not too small, which tends not to deteriorate the holding power of the holding sealing material.

Meanwhile, the cross-section of the penetration portion refers to a cross-section which is in approximately parallel with the main surface of the holding sealing material.

FIG. 15A, FIG. 15B, FIG. 15C, FIG. 15D, and FIG. 15E each are a plain view schematically showing an example of a holding sealing material according to the third embodiment of the present invention.

A holding sealing material 30A shown in FIG. 15A has a similar structure as that of the holding sealing material 10A shown in FIG. 2 as one example of the holding sealing material according to the first embodiment of the present invention, or that of the holding sealing material 20A shown in FIG. 9 as one example of the holding sealing material according to the second embodiment of the present invention, except that three penetration portions 34a, 34b, and 34c are formed.

A holding sealing material 30B shown in FIG. 15B has a similar structure as that of the holding sealing material 10B shown in FIG. 4A as one example of the holding sealing material according to the first embodiment of the present invention, or that of the holding sealing material 20B shown in FIG. 10A as one example of the holding sealing material according to the second embodiment of the present invention, except that three penetration portions 34d, 34e, and 34f are formed.

A holding sealing material 30C shown in FIG. 15C has a similar structure as that of the holding sealing material 10C shown in FIG. 4B as one example of the holding sealing material according to the first embodiment of the present invention, or that of the holding sealing material 20C shown in FIG. 10B as one example of the holding sealing material according to the second embodiment of the present invention, except that three penetration portions 34g, 34h, and 34i are formed.

A holding sealing material 30D shown in FIG. 15D has a similar structure as that of the holding sealing material 10D shown in FIG. 4C as one example of the holding sealing material according to the first embodiment of the present invention, or that of the holding sealing material 20D shown in FIG. 10C as one example of the holding sealing material according to the second embodiment of the present invention, except that three penetration portions 34j, 34k, and 34l are formed.

A holding sealing material 30E shown in FIG. 15E has a similar structure as that of the holding sealing material 10E shown in FIG. 4D as one example of the holding sealing material according to the first embodiment of the present invention, or that of the holding sealing material 20E shown in FIG. 10D as one example of the holding sealing material according to the second embodiment of the present invention, except that three penetration portions 34m, 34n, and 34o are formed.

In each of FIG. 15A, FIG. 15B, FIG. 15C, FIG. 15D, and FIG. 15E, a pair of the penetration portions among the three penetration portions of the holding sealing material may be referred to as being formed at positions approximately line-symmetrical with respect to a center line of the holding sealing material in the width direction, or at positions approximately point-symmetrical with respect to the center of the holding sealing material. For example, in the holding sealing material 30A shown in FIG. 15A, the pair of penetration portions are the penetration portions 34a and 34c.

FIG. 16A, FIG. 16B, FIG. 16C, FIG. 16D, and FIG. 16E each are a plain view schematically showing one of other examples of a holding sealing material according to the third embodiment of the present invention.

Figure 16A:
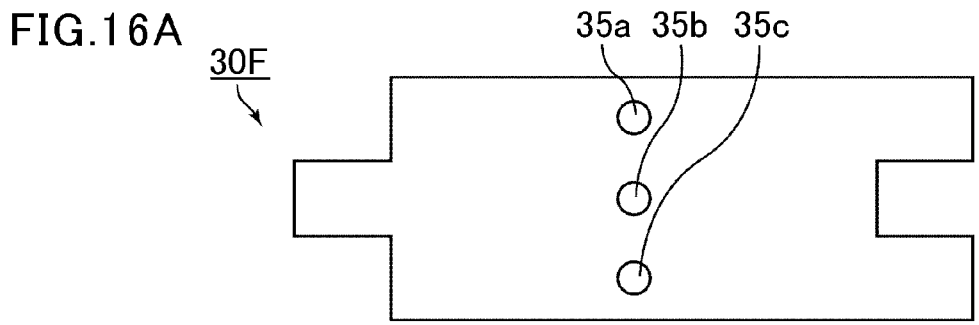
FIG. 16A, FIG. 16B, FIG. 16C, FIG. 16D and FIG. 16E each are a plain view schematically showing one of other examples of a holding sealing material according to the third embodiment of the present invention.

A holding sealing material 30F shown in FIG. 16A has a similar structure as that of the holding sealing material 10A shown in FIG. 2 as one example of the holding sealing material according to the first embodiment of the present invention, or that of the holding sealing material 20G shown in FIG.

11A as one example of the holding sealing material according to the second embodiment of the present invention, except that three penetration portions 35a, 35b, and 35c are formed.

Figure 16B:
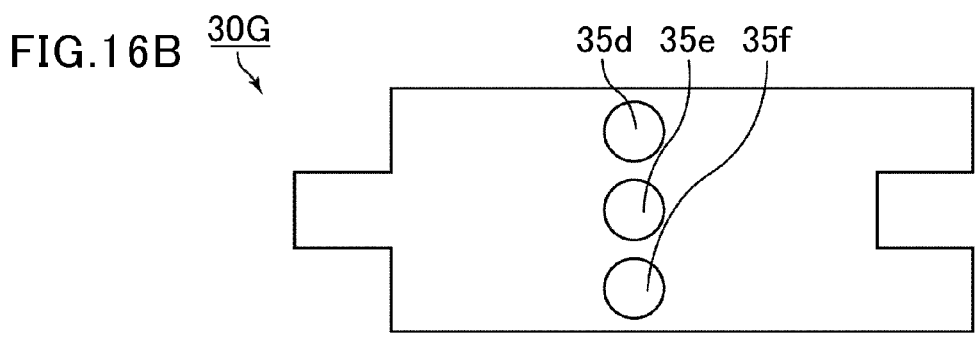

A holding sealing material 30G shown in FIG. 16B has a similar structure as that of the holding sealing material 10B shown in FIG. 4A as one example of the holding sealing material according to the first embodiment of the present invention, or that of the holding sealing material 20H shown in FIG. 11B as one example of the holding sealing material according to the second embodiment of the present invention, except that three penetration portions 35d, 35e, and 35f are formed.

Figure 16C:
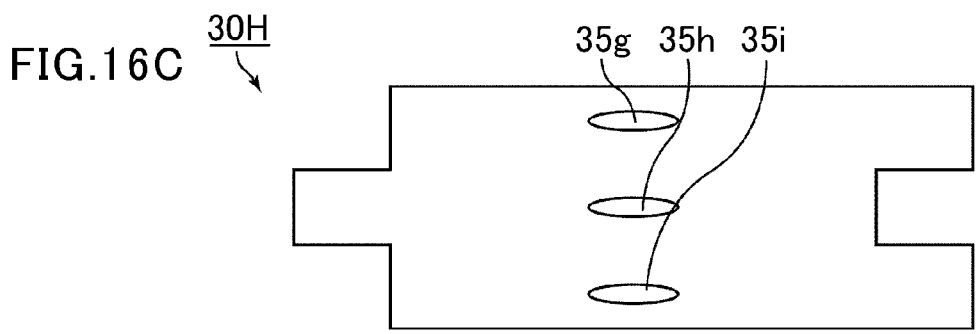

A holding sealing material 30H shown in FIG. 16C has a similar structure as that of the holding sealing material 10C shown in FIG. 4B as one example of the holding sealing material according to the first embodiment of the present invention, or that of the holding sealing material 20I shown in FIG. 11C as one example of the holding sealing material according to the second embodiment of the present invention, except that three penetration portions 35g, 35h, and 35i are formed.

Figure 16D:
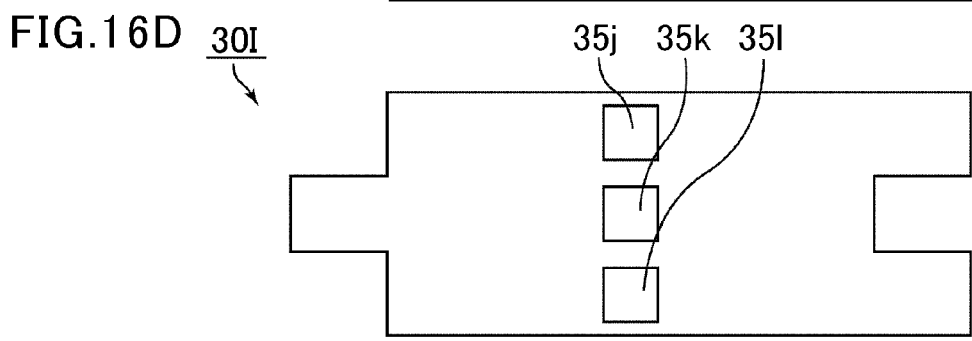

A holding sealing material 30I shown in FIG. 16D has a similar structure as that of the holding sealing material 10D shown in FIG. 4C as one example of the holding sealing material according to the first embodiment of the present invention, or that of the holding sealing material 20J shown in FIG. 11D as one example of the holding sealing material according to the second embodiment of the present invention, except that three penetration portions 35j, 35k, and 35l are formed.

Figure 16E:
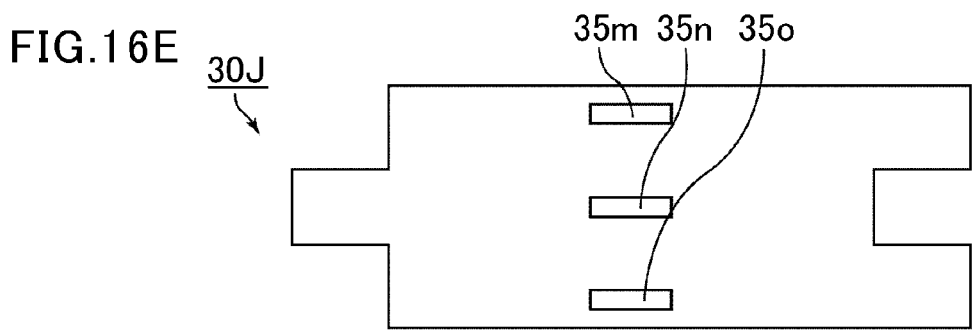

A holding sealing material 30J shown in FIG. 16E has a similar structure as that of the holding sealing material 10E shown in FIG. 4D as one example of the holding sealing material according to the first embodiment of the present invention, or that of the holding sealing material 20K shown in FIG. 11E as one example of the holding sealing material according to the second embodiment of the present invention, except that three penetration portions 35m, 35n, and 35o are formed.

In each of FIG. 16A, FIG. 16B, FIG. 16C, FIG. 16D, and FIG. 16E, a pair of the penetration portions among the three penetration portions of the holding sealing material may be referred to as being formed at positions approximately line-symmetrical with respect to a center line of the holding sealing material in the length direction, or at positions approximately point-symmetrical with respect to the center of the holding sealing material. For example, in the holding sealing material 30F shown in FIG. 16A, the pair of penetration portions are the penetration portions 35a and 35c.

The following description will discuss the exhaust gas purifying apparatus according to the third embodiment of the present invention.

The exhaust gas purifying apparatus according to the third embodiment of the present invention has a similar structure as that of the exhaust gas purifying apparatus according to the first embodiment or the second embodiment of the present invention, except for the structure of the holding sealing material.

Figure 17A:
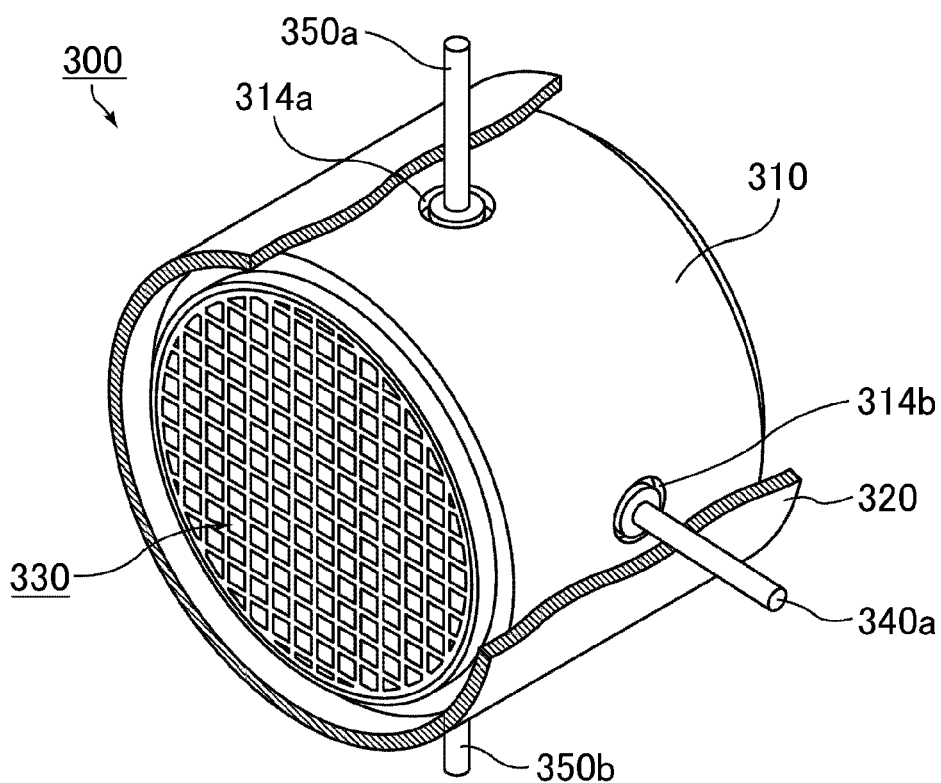
FIG. 17A is a perspective cross-sectional cutaway view schematically showing one example of the exhaust gas purifying apparatus according to the third embodiment of the present invention.
Figure 17B:
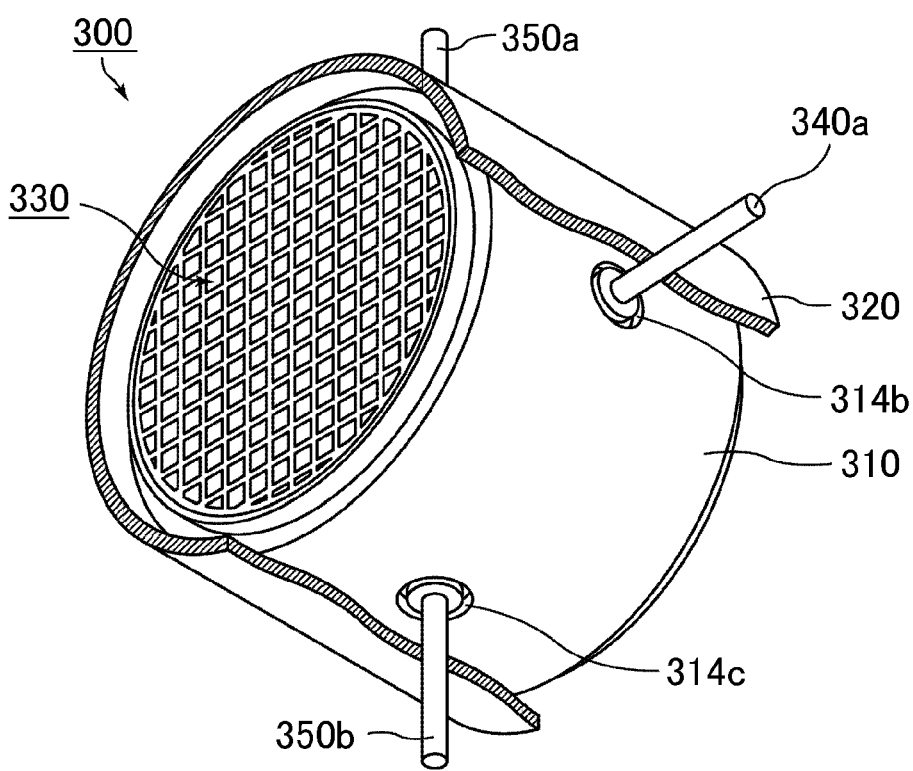
FIG. 17B is a perspective cross-sectional cutaway view seen from below the exhaust gas purifying apparatus shown in FIG. 17A.

FIG. 17A is a perspective cross-sectional cutaway view schematically showing one example of the exhaust gas purifying apparatus according to the third embodiment of the present invention. FIG. 17B is a perspective cross-sectional cutaway view seen from below the exhaust gas purifying apparatus shown in FIG. 17A.

In the exhaust gas purifying apparatus of the present embodiment, the holding sealing material of the present embodiment is used.

In an exhaust gas purifying apparatus 300 shown in FIG. 17A and FIG. 17B, the holding sealing material 30A shown in FIG. 15A is used as a holding sealing material 310. In this case, for example, a positive-side electrode member 350a tends to be disposed at a penetration portion 314a of the holding sealing material, a sensor 340a tends to be disposed at a penetration portion 314b of the holding sealing material, and a negative-side electrode member 350b tends to be disposed at a penetration portion 314c of the holding sealing material.

The exhaust gas-treating body described in the first embodiment of the present invention can be used as the exhaust gas-treating body forming the exhaust gas purifying apparatus of the present embodiment.

As a casing forming the exhaust gas purifying apparatus of the present embodiment, the casing explained in the first embodiment or the second embodiment of the present invention having three holes formed therein can be used.

Meanwhile, although not shown in FIG. 17A and FIG. 17B, the casing 320 forming the exhaust gas purifying apparatus 300 is provided with three holes to allow the sensor and the electrode members to pass therethrough.

The sensor explained in the first embodiment of the present invention can be used as a sensor included in the exhaust gas purifying apparatus according to the present embodiment. The electrode member described in the second embodiment of the present invention can be used as an electrode member forming the exhaust gas purifying apparatus of the present embodiment.

A method of manufacturing the exhaust gas purifying apparatus according to the third embodiment of the present invention is similar to the method of manufacturing the exhaust gas purifying apparatus according to the first embodiment or the second embodiment of the present invention.

In the present embodiment, the effects (1) to (3) described in the first embodiment of the present invention and the effect (4) described in the second embodiment of the present invention can be exerted.

(Fourth Embodiment)

The following description will discuss the forth embodiment that is one of the embodiments of the present invention.

In the first to the third embodiments of the present invention, three levels of steps are formed in each of the first end face and the second end face of the holding sealing material. In the fourth embodiment of the present invention, two levels of steps are formed in each of the first end face and the second end face of the holding sealing material.

First, a holding sealing material according to the fourth embodiment of the present invention is described.

The holding sealing material according to the fourth embodiment of the present invention has a similar structure as the holding sealing materials according to the first embodiment to the third embodiment of the present invention, except that two levels of steps are formed.

In the holding sealing material of the present embodiment, one projected portion is formed at the first end face, and one projected portion is formed at the second end face. In other words, the holding sealing material forming the exhaust gas purifying apparatus of the present embodiment is provided with two levels of steps.

In the holding sealing material of the present embodiment, one to three penetration portions are formed. The one to three penetration portions are formed in a manner penetrating the holding sealing material in the thickness direction of the holding sealing material.

In the holding sealing material of the present embodiment, the positions of the penetration portions formed are not particularly limited, but are preferably the positions other than the projected portions.

If a plurality of the penetration portions are formed in the holding sealing material of the present embodiment, a pair of the penetration portions are preferably formed at positions approximately line-symmetrical with respect to a center line of the holding sealing material in the width direction, at positions approximately line-symmetrical with respect to a center line of the holding sealing material in the length direction, or at positions approximately point-symmetrical with respect to the center of the holding sealing material.

If a plurality of the penetration portions are formed in the holding sealing material of the present embodiment, a pair of the penetration portions are preferably formed at positions approximately line-symmetrical with respect to a center line of the holding sealing material in the width direction. In this case, the distance between the pair of the penetration portions is preferably about 50% the length of the holding sealing material.

As the shape of the penetration portions and the cross-sectional shape of the penetration portions in the holding sealing material of the present embodiment, the shapes described in the first embodiment to the third embodiment of the present invention may be exemplified.

If a plurality of the penetration portions are formed in the holding sealing material of the present embodiment, the shape and the size of the penetration portions of the holding sealing material may be approximately the same or may be different from one another.

The diameters of the cross-section of the penetration portions and the cross-sectional areas of the penetration portions in the holding sealing material of the present embodiment are preferably in the ranges described in the first embodiment to the third embodiment of the present invention.

FIG. 18A, FIG. 18B, FIG. 18C, FIG. 18D, and FIG. 18E are each a plain view schematically showing one example of a holding sealing material according to the fourth embodiment of the present invention.

Figure 18A:
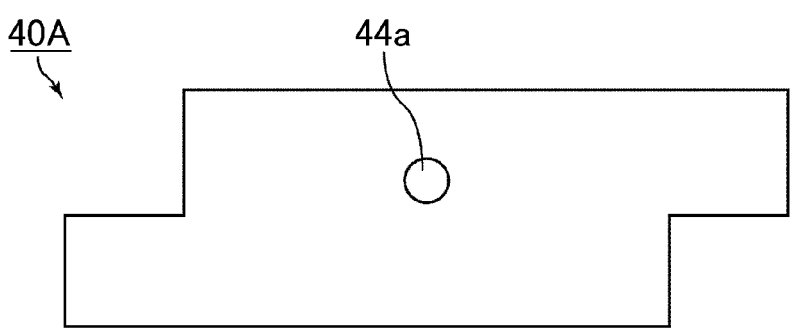
FIG. 18A, FIG. 18B, FIG. 18C, FIG. 18D, and FIG. 18E are each a plain view schematically showing one example of a holding sealing material according to a fourth embodiment of the present invention.

A holding sealing material 40A shown in FIG. 18A has a similar structure as that of the holding sealing material 10A shown in FIG. 2, which is one example the holding sealing material according to the first embodiment of the present invention, except that two levels of steps are provided.

Figure 18B:
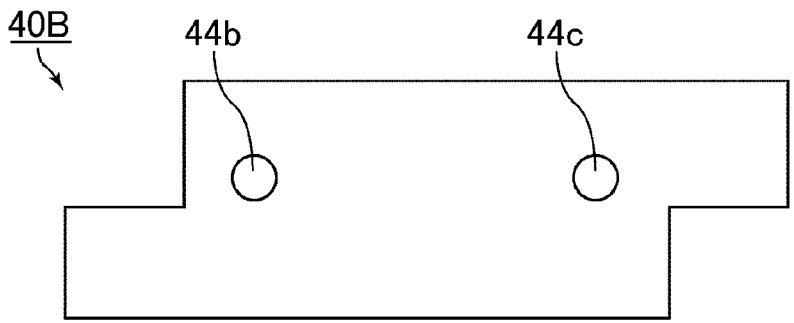

A holding sealing material 40B shown in FIG. 18B has a similar structure as that of the holding sealing material 20A shown in FIG. 9, which is one example the holding sealing material according to the second embodiment of the present invention, except that two levels of steps are provided.

Figure 18C:
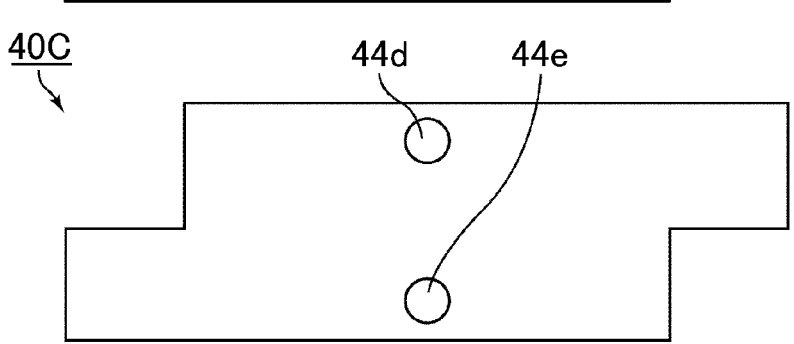

A holding sealing material 40C shown in FIG. 18C has a similar structure as that of the holding sealing material 20G shown in FIG. 11A, which is one example the holding sealing material according to the second embodiment of the present invention, except that two levels of steps are provided.

Figure 18D:
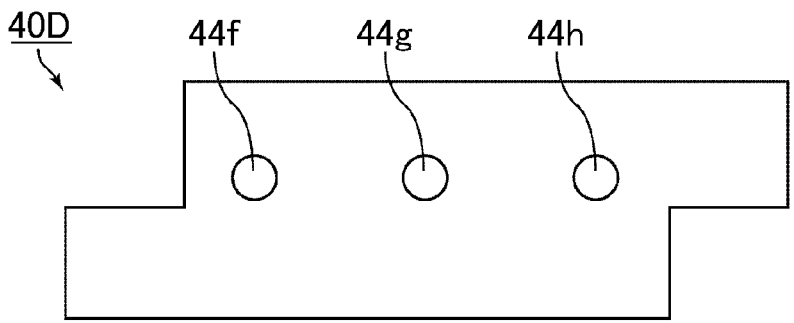

A holding sealing material 40D shown in FIG. 18D has a similar structure as that of the holding sealing material 30A shown in FIG. 15A, which is one example the holding sealing material according to the third embodiment of the present invention, except that two levels of steps are provided.

Figure 18E:
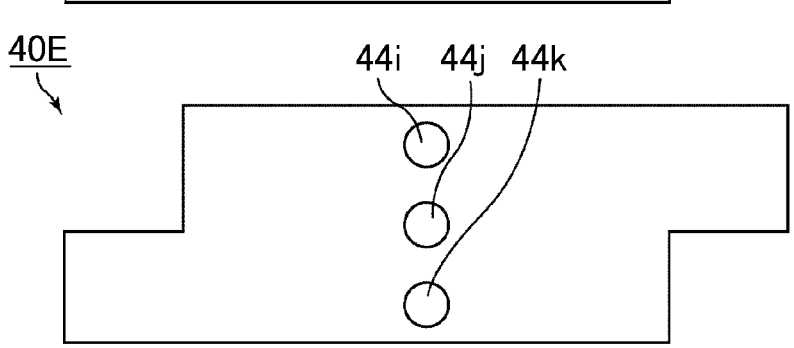

A holding sealing material 40E shown in FIG. 18E has a similar structure as that of the holding sealing material 30F shown in FIG. 16A, which is one example the holding sealing material according to the third embodiment of the present invention, except that two levels of steps are provided.

Meanwhile, with regard to the holding sealing material 40A shown in FIG. 18A, the holding sealing material 40B shown in FIG. 18B, the holding sealing material 40C shown in FIG. 18C, the holding sealing material 40D shown in FIG. 18D, and the holding sealing material 40E shown in FIG. 18E, each of the projected portion tends to engage with a portion facing the projected portion of the holding sealing material when the first end face of the holding sealing material is made in contact with the second end face of the holding sealing material.

Next, an exhaust gas purifying apparatus according to the fourth embodiment of the present invention is described.

The exhaust gas purifying apparatus according to the fourth embodiment of the present invention has a similar structure as that of the exhaust gas purifying apparatus according to the first embodiment to the third embodiment of the present invention, except for the structure of the holding sealing material.

The exhaust gas purifying apparatus of the present embodiment includes the holding sealing material of the present embodiment.

The exhaust gas-treating body explained in the first embodiment of the present invention may be used as the exhaust gas-treating body forming the exhaust gas purifying apparatus of the present embodiment.

The casings described in the first to the third embodiments of the present invention can be used as a casing forming the exhaust gas purifying apparatus of the present embodiment.

The sensor described in the first embodiment of the present invention can be used as a sensor forming the exhaust gas purifying apparatus of the present embodiment. The electrode member described in the second embodiment of the present invention can be used as an electrode member forming the exhaust gas purifying apparatus of the present embodiment.

The method of manufacturing the exhaust gas purifying apparatus according to the fourth embodiment of the present invention is similar with the method of manufacturing the exhaust gas purifying apparatus according to any of the first to the third embodiment of the present invention.

The present embodiment can exert the effects (1) to (3) explained in the first embodiment and the effect (4) explained in the second embodiment of the present invention.

(Other Embodiments)

In the holding sealing materials according to the first embodiment to the fourth embodiment of the present invention, the penetration portion of the holding sealing material is formed in a direction approximately in parallel with the thickness direction of the holding sealing material, i.e., a direction approximately perpendicular to the length direction of the holding sealing material.

However, in the holding sealing material of the embodiments of the present invention, the penetration portion of the holding sealing material may be formed diagonally with respect to the thickness direction of the holding sealing material.

Figure 19A:
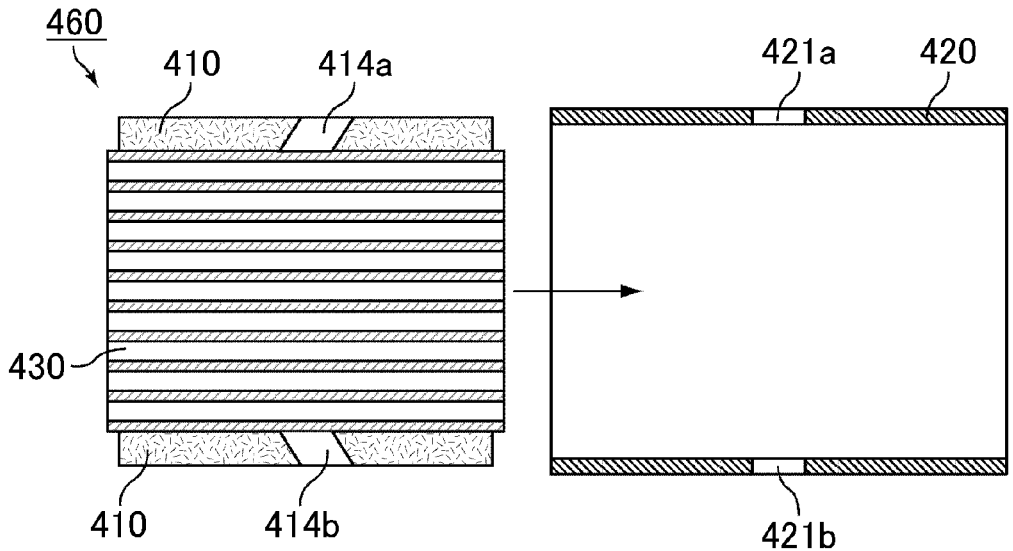
FIG. 19A, FIG. 19B, and FIG. 19C are each a cross-sectional view schematically showing steps of manufacturing an exhaust gas purifying apparatus using one of other examples of the holding sealing material according to the embodiment of the present invention.
Figure 19B:
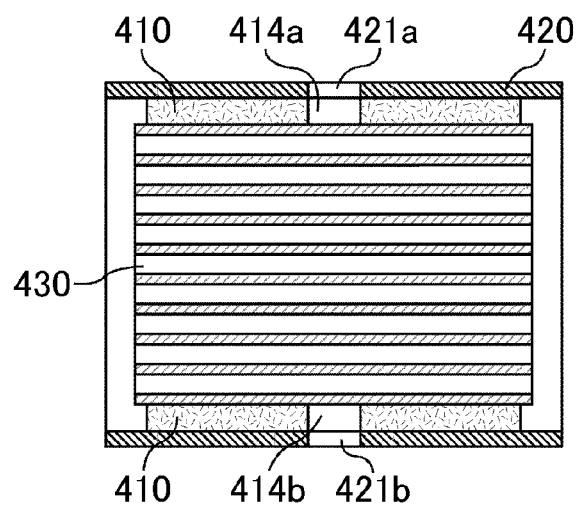
Figure 19C:
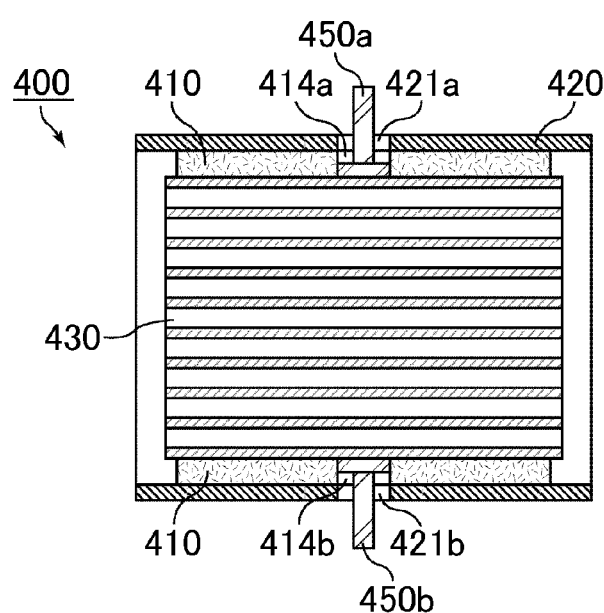

FIG. 19A, FIG. 19B, and FIG. 19C are each a cross-sectional view schematically showing steps of manufacturing an exhaust gas purifying apparatus using one of other examples of the holding sealing material according to the embodiment of the present invention.

FIG. 19A shows an aspect where a wound body 460 is stuffed in a casing 420. In a holding sealing material 410 shown in FIG. 19A, penetration portions 414a and 414b of the holding sealing material are formed diagonally with respect to the thickness direction of the holding sealing material 410.

Upon stuffing the wound body 460 in the casing 420, the holding sealing material 410 tends to receive a shearing force in a direction opposite to the stuffing direction, thereby changing the directions of the penetration portions 414a and 414b of the holding sealing material 410. As a result, as shown in FIG. 19B, the directions of the penetration portions 414a and 414b of the holding sealing material 410 after the stuffing tend to become approximately perpendicular to the length direction of the holding sealing material 410.

Therefore, as shown in FIG. 19C, electrode members 450a and 450b tend to be easily disposed at the approximately perpendicularly-extending penetration portions 414a and 414b.

In the case that the penetration portion of the holding sealing material is formed diagonally with respect to the thickness direction of the holding sealing material according to the embodiments of the present invention, examples of the cross-sectional shape of the penetration portion include shapes described in the first embodiment to the fourth embodiment of the present invention.

In the case that the penetration portion of the holding sealing material according to the embodiments of the present invention is formed diagonally with respect to the thickness direction of the holding sealing material of the embodiment of the present invention, the angle of the penetration portion with respect to the length direction of the holding sealing material is appropriately determined depending on the stuffing condition in manufacturing the exhaust gas purifying apparatus. Preferably the angle is from about 25° to about 89.5°, and more preferably from about 45° to about 60°.

If the angle of the penetration portion is about 25° or more with respect to the thickness direction of the holding sealing material, the inclination of the penetration portion of the holding sealing material is not too acute. Therefore, upon disposing at least one of an electrode and a sensor at the penetration portion, the holding sealing material is less likely to be broken. If the angle of the penetration portion is about 89.5° or less with respect to the length direction of the holding sealing material, the effect derived from diagonally forming the penetration portion of the holding sealing material to easily dispose an electrode member and the like tends to be sufficiently obtained.

Meanwhile, as shown in FIG. 19A, upon stuffing the wound boy 460 into the casing 420, the holding sealing material 410 tends to receive a shearing force in a direction opposite to the stuffing direction. As a result, the directions of the ends of the holding sealing material 410 tend to change in FIG. 19B and FIG. 19C. However, since FIG. 19B and FIG. 19C are intended to explain the changes of the directions of the penetration portions 414a and 414b in the holding sealing material 410, inclination of the ends of the holding sealing material is not shown for convenience.

Moreover, in the exhaust gas purifying apparatus 100 shown in FIG. 5A and FIG. 5B, the exhaust gas purifying apparatus 200 shown in FIG. 12A and FIG. 12B, and the exhaust gas purifying apparatus 300 shown in FIG. 17A and FIG. 17B, the direction of the penetration portion of the holding sealing material and the direction of the ends of the holding sealing material in the casing are shown in approximately perpendicular to the length direction of the holding sealing material for convenience. However, in the exhaust gas purifying apparatus of the embodiments of the present invention, the direction of the penetration portion of the holding sealing material and the direction of the end of the holding sealing material in the casing may be inclined.

In the holding sealing material according to the embodiments of the present invention, the number of the penetration portions of the holding sealing material is not particularly limited, and may be four or more. However, increase in the number of the penetration portions of the holding sealing material reduces the area of the holding sealing material, and thus tends to decrease the holding power of the holding sealing material. Therefore, the number of the penetration portions of the holding sealing material is preferably as small as possible. The number of the penetration portions of the holding sealing material is preferably one or two.

In the holding sealing material according to the embodiments of the present invention, in the case that a plurality of penetration portions are formed in the holding sealing material, and a pair of the penetration portions are formed at positions approximately line-symmetrical with respect to a center line of the holding sealing material in the width direction, at positions approximately line-symmetrical with respect to a center line of the holding sealing material in the length direction, or at positions approximately point-symmetrical with respect to the center of the holding sealing material, the positions where the pair of the penetration portions are formed in the holding sealing material are not limited to the positions explained in figures of the first embodiment to the fourth embodiment of the present invention. The positions may be other positions satisfying the aforementioned conditions. The positions where penetration portions other than the pair of the penetration portions in the holding sealing material are not limited to the positions explained in figures of the first embodiment to the fourth embodiment of the present invention, but may be at any positions.

In the holding sealing material according to the first to the third embodiments of the present invention, each of the first end face and the second end face of the holding sealing material has three levels of steps. In the holding sealing material according to the fourth embodiment of the present invention, each of the first end face and the second end face of the holding sealing material has two levels of steps.

However, in the holding sealing material according to the embodiments of the present invention, the number of levels of the steps in the holding sealing material is not particularly limited. Therefore, each of the first end face and the second end face of the holding sealing material may have four levels or more of steps.

Meanwhile, in the case that each of the first end face and the second end face of the holding sealing material has three levels or more of steps, a convex formed by the projected portion preferably engages with a concave formed by the projected portions when the first end face of the holding sealing material is made in contact with the second end face of the holding sealing material.

In the holding sealing material according to the embodiments of the present invention, each of the first end face and the second end face of the holding sealing material may have no step.

In the exhaust gas purifying apparatus according to the embodiments of the present invention, at least one of an electrode member and a sensor may be disposed at any position as long as the electrode member and/or the sensor are/is disposed at the penetration portion of the holding sealing material. Moreover, a plurality of electrode members and/or sensors may be disposed in a single penetration portion of the holding sealing material.

Furthermore, in the exhaust gas purifying apparatus according to the embodiments of the present invention, if a gap is formed between the first end face and the second end face of the holding sealing material, at least one of an electrode member and a sensor may be disposed in the gap in the holding sealing material.

In the first to the fourth embodiments of the present invention, the methods for manufacturing the exhaust gas purifying apparatus using stuffing system (press-fitting system) are mainly explained.

The exhaust gas purifying apparatuses according to the embodiments of the present invention may also be manufactured by a sizing method (swaging method). One example of the method of manufacturing the exhaust gas purifying apparatus using a sizing method will be explained below with reference to the drawings. Meanwhile, since the winding step, position adjustment step, and disposing step (first disposing step) are similar with those applied in the first embodiment of the present invention, only a housing step will be described.

Figure 20A:
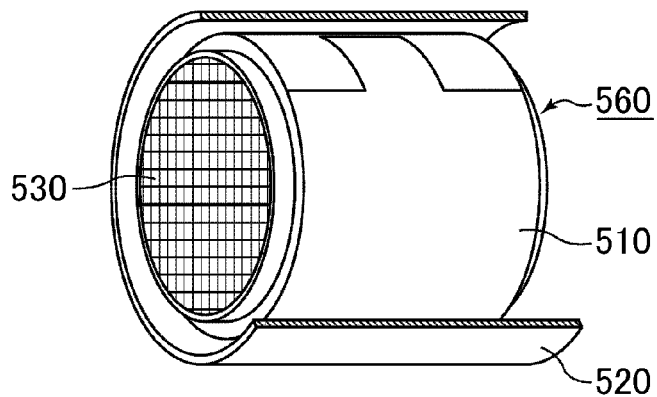
FIG. 20A, FIG. 20B and FIG. 20C each are a perspective view schematically showing one of other examples of a housing step in the method of manufacturing an exhaust gas purifying apparatus according to the embodiments of the present invention.
Figure 20B:
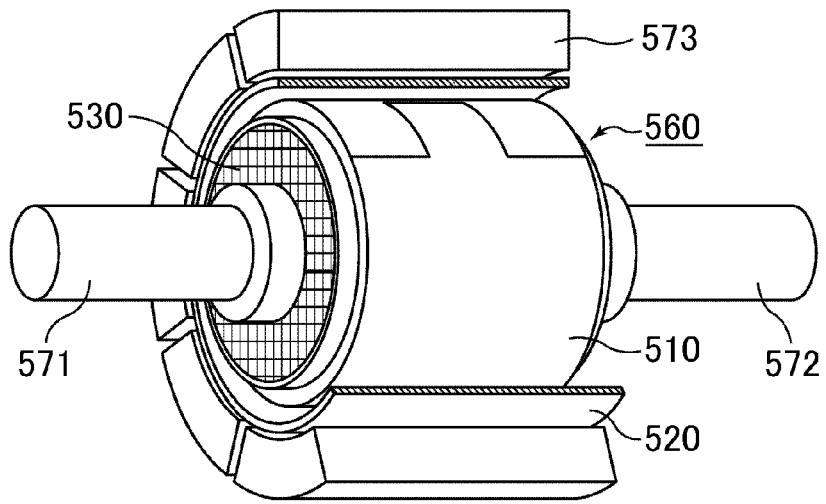
Figure 20C:
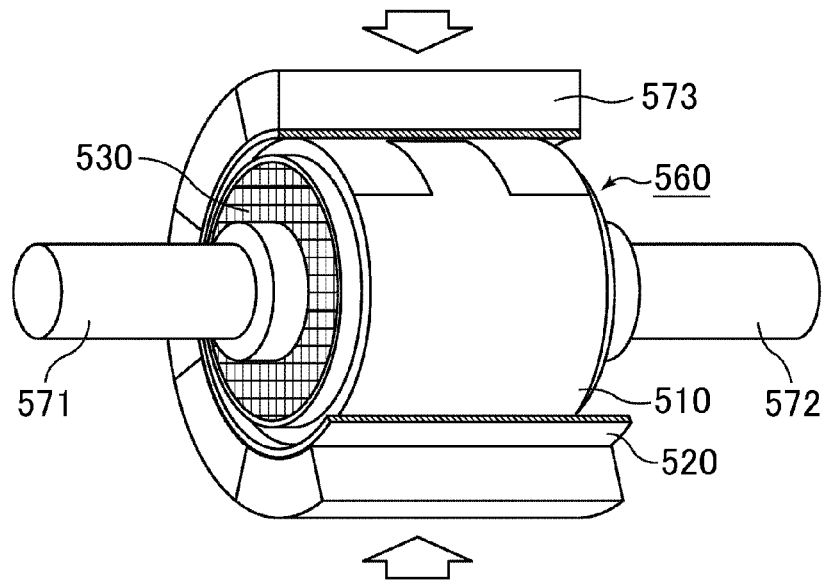

FIG. 20A, FIG. 20B and FIG. 20C each are a perspective view schematically showing one of other examples of a housing step in the method of manufacturing an exhaust gas purifying apparatus according to the embodiments of the present invention.

In the housing step, first, as shown in FIG. 20A, a wound body 560 (an exhaust gas-treating body 530 with a holding sealing material 510 wound therearound) is softly introduced into the casing 520.

As used herein, the wording "softly" means "not stuffing," or specifically means introducing the wound body with no contact between the holding sealing material 510 and the inner wall of the casing 520 or introducing the wound body in such a slightly compressed state that does not cause damage in the holding sealing material 510 regardless of occurrence of the contact. Preferably, the wound body is introduced in the casing while being supported by later-described shafts 571 and 572 shown in FIG. 20B in a state that the wound body 560 would drop from the casing 520 unless it is supported by the shafts.

Next, as shown in FIG. 20B, the exhaust gas-treating body 530 is shifted in the casing 520 while being sandwiched by the shafts 571 and 572 so that the exhaust gas-treating body 530 is held at a predetermined position.

Thereafter, the diameter of the casing 520 is reduced as shown in FIG. 20C. In other words, compression force is applied to the outer circumference of the casing 520 to reduce the inner diameter of the casing 520. Specifically, the body of the casing 520 is pressed by a collet 573 from the outer circumference of the casing 520 in the centripetal direction to compress the portion and the holding sealing material 510 existing therein. Thereby, the holding sealing material 510 and the exhaust gas-treating body 530 are held inside the casing 520. The exhaust gas-treating body 530 is held at a predetermined position in the casing 520 by the surface pressure generated by the repulsion from the compressed holding sealing material 510.

Through the above process, the wound body tends to be housed in the casing.

In FIG. 20A, FIG. 20B, and FIG. 20C, the penetration portion formed in the holding sealing material is omitted.

In the holding sealing material according to the embodiments of the present invention, if a projected portion is formed in the first end face and the second end face of the holding sealing material, the size of the projected portion is preferably from about 10 mm in width×about 10 mm in length to about 200 mm in width×about 200 mm in length, and more preferably from about 20 mm in width×about 20 mm in length to about 100 mm in width×about 100 mm in length.

If the holding sealing material having the projected portion with the aforementioned shape is used for manufacturing an exhaust gas purifying apparatus, since the holding sealing material tends to fit due to the projected portion, the exhaust gas-treating body tends to be firmly supported by the holding sealing material.

If the size of the projected portion is about 10 mm in width×about 10 mm or more in length or about 200 mm in width×about 200 mm or less in length, the contact area between the first end face and the second end face of the holding sealing material is not too small when the holding sealing material is wound around the exhaust gas-treating body. Therefore, the first end face and the second end face of the holding sealing material are more likely to be bonded one another. As a result, the exhaust gas-treating body tends to be easily supported by the holding sealing material.

The inorganic fibers forming the holding sealing material according to the embodiments of the present invention are not limited to the aforementioned inorganic fibers containing alumina and silica, but may be inorganic fibers containing other inorganic compounds as well.

Moreover, of alumina and silica, the inorganic fibers containing only alumina or the inorganic fibers containing only silica may be used.

As the compounding amount of the inorganic fibers containing alumina and silica, a weight ratio in a range from $Al_2O_3:SiO_2$=about 60:40 to about 80:20 is preferably used, and more preferably, a weight ratio in a range from $Al_2O_3:SiO_2$=about 70:30 to about 74:26 is used.

If the alumina content is the preferable maximum alumina content ($Al_2O_3:SiO_2$=about 80:20) or less in the above compounding amount, crystallization of alumina and silica less easily proceeds. Thus, the flexibility of the inorganic fibers tends not to decrease. Moreover, if the silica content is the preferable minimum silica content ($Al_2O_3:SiO_2$=about 80:20) or more in the above compounding amount, the rigidity of the inorganic fibers is less likely to be lacking, which leads to obtaining sufficient shear strength easily. As a result, the winding property to the exhaust gas-treating body is less likely to be reduced, and thus the holding sealing material tends not to break.

In the case of the inorganic fibers containing only alumina of alumina and silica, in addition to alumina, for example, additives, such as CaO, MgO and $ZrO_2$, may be contained therein.

The inorganic fibers containing only silica, of alumina and silica, may also contain additives such as CaO, MgO and $ZrO_2$, in addition to silica.

The average fiber length of the inorganic fibers forming the holding sealing material according to the embodiments of the present invention is preferably from about 5 mm to about 150 mm, and more preferably from about 10 mm to about 80 mm.

In the case of the inorganic fibers having average fiber length of about 5 mm or more, since the fiber length of the inorganic fibers is not too short, the inorganic fibers tend not to insufficiently entangle one another. As a result, the holding sealing material tends not to have low shear strength. In the case of the inorganic fibers having average fiber length of about 150 mm or less, since the fiber length of the inorganic fibers is not too long, handling property of the inorganic fibers is less likely to be deteriorated in manufacturing the holding sealing material. As a result, the winding property to the exhaust gas-treating body is less likely to be deteriorated, and thus the holding sealing material tends not to break.

The average fiber diameter of the inorganic fibers forming the holding sealing material according to the embodiments of the present invention is preferably from about 1 μm to about 20 μm, and more preferably from about 3 μm to about 10 μm.

In the case of the inorganic fibers having average fiber diameter of from about 1 μm to about 20 μm, the strength and the flexibility of the inorganic fibers tend to be sufficiently high, making it easier to improve the shear strength of the holding sealing material.

In the case of the inorganic fibers having average fiber diameter of about 1 μm or more, the inorganic fibers are not thin and thus tend not to break, which tends not to allow the inorganic fibers to have an insufficient tensile strength. In the case of the inorganic fibers having average fiber diameter of about 20 μm or less, the inorganic fibers tend to bend, which tends not to allow the inorganic fibers to have an insufficient flexibility.

The weight per unit area of the holding sealing material according to the embodiments of the present invention is preferably from about 500 g/m² to about 7000 g/m², and more preferably from about 1000 g/m² to about 4000 g/m², although not limited thereto. In the case of the weight per unit area of the holding sealing material of about 500 g/m² or more, the holding sealing material tends to have sufficient holding power. In the case of the weight per unit area of the holding sealing material of about 7000 g/m² or less, the volume of the holding sealing material tends to be reduced. For this reason, if an exhaust gas purifying apparatus is manufactured by using the holding sealing material of the above two cases, the exhaust gas-treating body tends not to drop from the casing.

The bulk density of the holding sealing material according to the embodiments of the present invention (bulk density of the holding sealing material before a wound body is stuffed into a casing) is preferably from about 0.05 g/cm³ to about 0.30 g/cm³, although not limited thereto. In the case of the bulk density of the holding sealing material of about 0.05 g/cm³ or more, the inorganic fibers tend not to weakly entangle and tend not to separate from one another. Therefore, a predetermined shape of the holding sealing material tends to be easily maintained. In the case of the bulk density of the holding sealing material of about 0.30 g/cm³ or less, the holding sealing material tends not to be hard. Therefore, the winding property to the exhaust gas-treating body tends not to deteriorate, and the holding sealing material tends not to break.

The thickness of the holding sealing material according to the embodiments of the present invention is preferably from about 3 mm to about 50 mm, and more preferably from about 6 mm to about 20 mm, although not limited thereto. In the case of the thickness of the holding sealing material of about 3 mm or more, the holding sealing material tends to have sufficient holding power. If an exhaust gas purifying apparatus is manufactured by using the holding sealing material of this kind, the exhaust gas-treating body tends not to drop from the casing. In the case of the thickness of the holding sealing material of about 50 mm or less, the holding sealing material is not too thick. Therefore, the winding property to the exhaust gas-treating body tends not to deteriorate, and the holding sealing material tends not to break.

In the case that a binder is added in the holding sealing material according to the embodiments of the present invention, examples of the method for adding a binder in the holding sealing material include a method which includes approximately uniformly spraying a binder solution containing an organic binder and the like to the entire holding sealing material with a spray and the like.

Examples of the organic binder contained in the binder solution include an acrylic resin, rubber such as acrylic rubber, a water soluble organic polymer such as carboxymethyl cellulose or polyvinyl alcohol, a thermoplastic resin such as styrene resin, and a thermosetting resin such as an epoxy resin.

Among the examples, acrylic rubber, acrylonitrile-butadiene rubber, and styrene-butadiene rubber are in particular preferable.

The compounding amount of the organic binder is preferably from about 0.5% by weight to about 15% by weight relative to the total weight of the inorganic fibers, the organic binder and the inorganic binder.

In the case of the compounding amount of the organic binder of about 0.5% by weight or more relative to the total weight of the inorganic fibers, the organic binder and the inorganic binder, the amount of the organic binder is not too small, which tends not to cause scattering of the inorganic fibers. Therefore, the strength of the holding sealing material tends not to decrease. In the case of the compounding amount of the organic binder of about 15% by weight or less relative to the total weight of the inorganic fibers, the organic binder and the inorganic binder, if the holding sealing material is used in an electrically heating exhaust gas purifying apparatus, the amount of the discharged organic components derived from the organic binder in the discharged exhaust gas is less likely to be increased. This tends not to increase environmental burden.

The binder solution may contain a plurality of kinds of the aforementioned organic binders.

Moreover, as the binder solution, in addition to a latex formed by dispersing the organic binder in water, a solution or the like prepared by dissolving the organic binder in water or an organic solvent may be used.

In the case that an inorganic binder is contained in the binder solution, examples of the inorganic binder include alumina sol, silica sol, or the like.

The compounding amount of the inorganic binder is preferably from about 0.5% by weight to about 15% by weight relative to the total of the inorganic fibers, the organic binder and the inorganic binder, although the compound ratio is not particularly limited as long as it tends to combine the inorganic fibers.

In the case of the compounding amount of the inorganic binder of about 0.5% by weight or more relative to the total of the inorganic fibers, the organic binder and the inorganic binder, the amount of the inorganic binder is not too small, which tends not to cause scattering of the inorganic fibers. Therefore, the strength of the holding sealing material tends not to decrease. In the case of the compounding amount of the inorganic binder of about 15% by weight or less relative to the total of the inorganic fibers, the organic binder and the inorganic binder, the holding sealing material is not too hard, and the holding sealing material tends not to break.

In the case that the holding sealing material according to the embodiments of the present invention has been provided with a needling treatment, the needling treatment may be performed on the entire base mat or a part of the base mat.

The needling treatment may be performed before adding the binder to the holding sealing material, or may be performed after adding the binder to the holding sealing material.

The needling treatment may be performed with, for example, a needling machine. The needling machine includes a support plate for supporting the base mat, and a needle board which is disposed at an upper side of the support plate and is capable of reciprocating in the punching direction (thickness direction of base mat). A large number of needles are attached to the needle board. The needle board is shifted on the base mat mounted on the support plate. By inserting and withdrawing the plurality of needles to and from the base mat, the inorganic fibers forming the base mat tends to be intricately entangled with one another.

The times of the needling treatment or the number of needles may be changed depending on the desired bulk density, the weight per unit area, or the like.

With regard to the holding sealing material forming the exhaust gas purifying apparatus according to the embodiments of the present invention, the number of sheets of the holding sealing material is not particularly limited as long as the holding sealing material according to the embodiments of the present invention is used, and one sheet of the holding sealing material may be used, or a plurality of sheets of the holding sealing materials mutually combined with one another may also be used.

Examples of the method for combining the plurality of holding sealing materials include a method in which the holding sealing materials are mutually stitched together with a sewing machine, a method in which holding sealing materials are mutually bonded to one another by using an adhesive tape, an adhesive material or the like, although not limited thereto.

The material for the casing forming the exhaust gas purifying apparatus according to the embodiments of the present invention is not particularly limited as long as it is a metal having heat resistance, and specific examples of the material include metals such as stainless steel, aluminum and iron.

The shape of the casing forming the exhaust gas purifying apparatus according to the embodiments of the present invention may be preferably prepared as a clam shell shape, a down-sizing type shape, or the like, in addition to an approximately cylindrical shape.

The shape of the exhaust gas-treating body in the exhaust gas purifying apparatus according to the embodiments of the present invention is not particularly limited as long as it is a pillar shape. In addition to an approximately round pillar shape, for example, a desired shape, such as an approximately cylindroid shape or a substantially rectangular pillar shape, with a desired size, may be used.

The exhaust gas-treating body forming the exhaust gas purifying apparatus according to the embodiments of the present invention may be a honeycomb structure which includes a cordierite or the like and is integrally formed as shown in FIG. 6. The exhaust gas-treating body may also be a honeycomb structure including silicon carbide or the like, in which a plurality of pillar-shaped honeycomb fired bodies are bonded by interposing an adhesive layer mainly containing ceramic therebetween, each of the honeycomb fired bodies having a large number of through holes placed in parallel with one another in the longitudinal direction with a separation wall interposed therebetween. Moreover, the exhaust gas-treating body forming the exhaust gas purifying apparatus may be a metal-made exhaust gas-treating body.

In the case of using the exhaust gas purifying apparatus according to the embodiments of the present invention as an electrically heated catalyst converter, a preferable material for the exhaust gas-treating body is a conductive ceramic such as phosphorus doped silicon carbide because of its excellent electric conductivity.

The exhaust gas-treating body forming the exhaust gas purifying apparatus according to the embodiments of the present invention is not limited to a catalyst carrier, and may be, for example, a honeycomb structure in which a large number of cells are placed in parallel with one another in the longitudinal direction with a cell wall interposed therebetween, with either end of each cell sealed with a plug, and the like. In this case, the exhaust gas-treating body tends to function as a filter (DPF) capable of removing PM contained in exhaust gas.

In the exhaust gas purifying apparatus according to the embodiments of the present invention, if a catalyst is supported on the exhaust gas-treating body forming the exhaust gas purifying apparatus, examples of the catalyst supported on the exhaust gas-treating body include noble metals such as platinum, palladium and rhodium. These catalysts may be used alone, or two or more kinds of these may be used in combination.

Examples of the catalyst also include alkali metals such as potassium and sodium, alkaline earth metals such as barium, metal oxides such as cerium oxide, and the like.

Examples of the method for supporting a catalyst on the exhaust gas-treating body include a method including heating the exhaust gas-treating body after having been impregnated with a solution containing a catalyst, a method including forming a catalyst supporting layer made of an alumina film on the surface of the exhaust gas-treating body and supporting a catalyst on the alumina film, and the like.

Examples of the method for forming the alumina film include a method in which the exhaust gas-treating body is heated after having been impregnated with a metal compound solution containing aluminum such as $Al(NO_3)_3$, or a method in which the exhaust gas-treating body is heated after having been impregnated with a solution containing alumina powder, and the like.

Moreover, as the method for supporting a catalyst on an alumina film, for example, a method may be used in which an exhaust gas-treating body on which an alumina film has been formed is impregnated with a solution containing noble metal, or the like, and then heated.

With regard to the holding sealing material according to the embodiments of the present invention, the essential feature is formation of at least one penetration portion penetrating the holding sealing material in the thickness direction. With regard to the exhaust gas purifying apparatus and the method of manufacturing the exhaust gas purifying apparatus according to the embodiments of the present invention, the essential feature is use of the holding sealing material according to the embodiments of the present invention. By appropriately combining the various structures described in the first to the fourth embodiments of the present invention and other embodiments (for example, number and position of electrode member and/or sensor, kinds of sensor, size of projected portion in holding sealing materials, composition of inorganic fibers forming holding sealing materials, and the like) with the essential features, desired effects are more likely to be obtained.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A holding sealing material comprising:
inorganic fibers;
a mat shape having a width direction, a length direction and a thickness direction;
a first end face and a second end face each provided approximately in parallel with the width direction; and
a penetration portion penetrating the holding sealing material in the thickness direction,
wherein the penetration portion of the holding sealing material is formed diagonally with respect to the thickness direction of the holding sealing material.

2. The holding sealing material according to claim 1, wherein the holding sealing material has two or more of the penetration portions.

3. The holding sealing material according to claim 2, wherein the holding sealing material has a pair of the penetration portions among the two or more penetration portions at positions approximately line-symmetrical with respect to a center line of the holding sealing material in the width direction, at positions approximately line- symmetrical with respect to a center line of the holding sealing material in the length direction, or at positions approximately point-symmetrical with respect to a center of the holding sealing material.

4. The holding sealing material according to claim 3, wherein the pair of the penetration portions at positions approximately line-symmetrical with respect to the center line of the holding sealing material in the width direction, and
a distance between the pair of the penetration portions is about 50% of a length of the holding sealing material in the length direction.

5. The holding sealing material according to claim 1, wherein each of the first end face and the second end face of the holding sealing material is provided with a step having at least one projected portion.

6. The holding sealing material according to claim 5, wherein the holding sealing material has the penetration portion at a position other than the projected portion of the holding sealing material.

7. The holding sealing material according to claim 1, wherein a number of the penetration portion is one.

8. The holding sealing material according to claim 1, wherein a shape of the penetration portion of the holding sealing material is at least one of an approximately round-pillar shape, an approximately rectangular-pillar shape, an approximately cylindroid shape, an approximately truncated cone shape, and a pillar shape having a bottom face surrounded by an approximately straight line and an approximately arc line.

9. The holding sealing material according to claim 1, wherein a diameter of a cross section of the penetration portion of the holding sealing material is from about 1 mm to about 100 mm.

10. An exhaust gas purifying apparatus comprising:
a casing provided with a hole;
an exhaust gas-treating body housed in the casing;
a holding sealing material wound around the exhaust gas-treating body and disposed between the exhaust gas-treating body and the casing, comprising:
inorganic fibers;
a mat shape having a width direction, a length direction and a thickness direction;
a first end face and a second end face each provided approximately in parallel with the width direction; and
at least one penetration portion penetrating the holding sealing material in the thickness direction; and
a position of the penetration portion of the holding sealing material wound around the exhaust gas-treating body being identical with a position of the hole of the casing,
wherein the penetration portion of the holding sealing material is formed diagonally with respect to the thickness direction of the holding sealing material.

11. The exhaust gas purifying apparatus according to claim 10, further comprising:
at least one of an electrode member and a sensor which is connected to the exhaust gas- treating body, passes through the holding sealing material, and penetrates the casing,
wherein at least one of the electrode member and the sensor is disposed at the penetration portion of the holding sealing material and the hole of the casing.

12. The exhaust gas purifying apparatus according to claim 11, the exhaust gas purifying apparatus being manufactured by a method comprising:
housing the exhaust gas-treating body with the holding sealing material wound around the exhaust gas-treating body in the casing;
adjusting the position of the penetration portion of the holding sealing material wound around the exhaust gas-treating body with the hole of the casing; and
disposing at least one of the electrode member and the sensor in a manner connecting to the exhaust gas-treating body, passing through the holding sealing material and penetrating the casing,
wherein the exhaust gas-treating body with the holding sealing material is housed by stuffing the exhaust gas-treating body with the holding sealing material wound around the exhaust gas-treating body into the casing, or by inserting the exhaust gas-treating body with the holding sealing material wound around the exhaust gas-treating body in the casing and thereafter reducing an inner diameter of the casing, and
at least one of the electrode member and the sensor is disposed by disposing at least one of the electrode member and the sensor at the penetration portion of the holding sealing material and the hole of the casing.

13. The exhaust gas purifying apparatus according to claim 10, wherein the holding sealing material has two or more of the penetration portions.

14. The exhaust gas purifying apparatus according to claim 13, wherein the holding sealing material has a pair of the penetration portions among the two or more penetration portions at positions approximately line-symmetrical with respect to a center line of the holding sealing material in the width direction, at positions approximately line- symmetrical with respect to a center line of the holding sealing material in the length direction, or at positions approximately point-symmetrical with respect to a center of the holding sealing material.

15. The exhaust gas purifying apparatus according to claim 14, wherein the holding sealing material has the pair of the penetration portions at positions approximately line-symmetrical with respect to the center line of the holding sealing material in the width direction, and
a distance between the pair of the penetration portions is about 50% of a length of the holding sealing material in the length direction.

16. The exhaust gas purifying apparatus according to claim 10, wherein each of the first end face and the second end face of the holding sealing material is provided with a step having at least one projected portion.

17. The exhaust gas purifying apparatus according to claim 16, wherein the holding sealing material has the penetration portion at a position other than the projected portion of the holding sealing material.

18. The exhaust gas purifying apparatus according to claim 10, wherein a number of the penetration portion is one.

19. The exhaust gas purifying apparatus according to claim 10, wherein a shape of the penetration portion of the holding sealing material is at least one of an approximately round-pillar shape, an approximately rectangular-pillar shape, an approximately cylindroid shape, an approximately truncated cone shape, and a pillar shape having a bottom face surrounded by an approximately straight line and an approximately arc line.

20. The exhaust gas purifying apparatus according to claim 10,
wherein a diameter of a cross section of the penetration portion of the holding sealing material is from about 1 mm to about 100 mm.

21. The exhaust gas purifying apparatus according to claim 10,
wherein the first end face and the second end face of the holding sealing material contact each other without a gap.

22. The exhaust gas purifying apparatus according to claim 10,
wherein the first end face and the second end face of the holding sealing material form a gap of a predetermined size.

23. The exhaust gas purifying apparatus according to claim 22,
wherein a distance between the first end face and the second end face of the holding sealing material is about 100 mm or less.

24. A method of manufacturing an exhaust gas purifying apparatus, comprising:
providing a holding sealing material which includes inorganic fibers, the holding sealing material having a mat shape which has a width direction, a length direction and a thickness direction, the holding sealing material having a first end face and a second end face each provided approximately in parallel with the width direction, the holding sealing material having at least one penetration portion penetrating the holding sealing material in the thickness direction;
winding the holding sealing material around an exhaust gas-treating body;
housing the exhaust gas-treating body in a casing to dispose the holding sealing material between the exhaust gas-treating body and the casing having a hole; and
adjusting a position of the penetration portion of the holding sealing material wound around the exhaust gas-treating body with the hole of the casing,
wherein a diameter of a cross section of the penetration portion of the holding sealing material is from about 1 mm to about 100 mm.

25. The method according to claim 24, further comprising:
disposing at least one of an electrode member and a sensor in a manner connecting to the exhaust gas-treating body, passing through the holding sealing material, and penetrating the casing after the position of the penetration portion of the holding sealing material is adjusted,
wherein, at least one of the electrode member and the sensor is disposed by disposing at least one of the electrode member and the sensor at the penetration portion of the holding sealing material and the hole of the casing.

26. The method according to claim 24,
wherein the exhaust gas-treating body with the holding sealing material wound around the exhaust gas-treating body is housed in the casing before the position of the penetration portion of the holding sealing material is adjusted, and
the exhaust gas-treating body with the holding sealing material is housed by stuffing the exhaust gas-treating body with the holding sealing material wound around the exhaust gas- treating body into the casing, or by inserting the exhaust gas-treating body with the holding sealing material wound around the exhaust gas-treating body in the casing and thereafter reducing an inner diameter or the casing.

27. The method according to claim 24,
wherein two or more of the penetration portions are formed.

28. A method of manufacturing an exhaust gas purifying apparatus, comprising:
providing a holding sealing material which includes inorganic fibers, the holding sealing material having a mat shape which has a width direction, a length direction and a thickness direction, the holding sealing material having a first end face and a second end face each provided approximately in parallel with the width direction, the holding sealing material having at least one penetration portion penetrating the holding sealing material in the thickness direction;
winding the holding sealing material around an exhaust gas-treating body;
housing the exhaust gas-treating body in a casing to dispose the holding sealing material between the exhaust gas-treating body and the casing having a hole; and
adjusting a position of the penetration portion of the holding sealing material wound around the exhaust gas-treating body with the hole of the casing,
wherein two or more of the penetration portions are formed, and
wherein a pair of the penetration portions among the two or more penetration portions are formed at positions approximately line-symmetrical with respect to a center line of the holding sealing material in the width direction, at positions approximately line-symmetrical with respect to a center line of the holding sealing material in the length direction, or at positions approximately point-symmetrical with respect to a center of the holding sealing material.

29. The method of according to claim 28,
wherein the pair of the penetration portions are formed at positions approximately line- symmetrical with respect to a center line of the holding sealing material in the width direction, and
a distance between the pair of the penetration portions is about 50% of a length of the holding sealing material in the length direction.

30. The method according to claim 24,
wherein each of the first end face and the second end face of the holding sealing material is provided with a step having of at least one projected portion.

31. The method according to claim 30,
wherein the penetration portion of the holding sealing material is formed at a position other than the projected portion of the holding sealing material.

32. The method according to claim 24,
wherein the penetration portion of the holding sealing material is formed diagonally with respect to the thickness direction of the holding sealing material.

33. The method according to claim 24,
wherein a number of the penetration portion is one.

34. The method according to claim 24,
wherein a shape of the penetration portion of the holding sealing material is at least one of an approximately round-pillar shape, an approximately rectangular-pillar shape, an approximately cylindroid shape, an approximately truncated cone shape, and a pillar shape having a bottom face surrounded by an approximately straight line and an approximately arc line.

35. The method according to claim 24,
wherein the first end face and the second end face of the holding sealing material contact each other without a gap.

36. The method according to claim 24,
wherein the first end face and the second end face of the holding sealing material form a gap of a predetermined size.

37. A method of manufacturing an exhaust gas purifying apparatus, comprising:
providing a holding sealing material which includes inorganic fibers the holding sealing material having a mat shape which has a width direction, a length direction and a thickness direction, the holding sealing material having a first end face and a second end face each provided approximately in parallel with the width direction, the holding sealing material having at least one penetration portion penetrating the holding sealing material in the thickness direction;
winding the holding sealing material around an exhaust gas-treating body;
housing the exhaust gas-treating body in a casing to dispose the holding sealing material between the exhaust gas-treating body and the casing having a hole; and
adjusting a position of the penetration portion of the holding sealing material wound around the exhaust gas-treating body with the hole of the casing,
wherein the first end face and the second end face of the holding sealing material form a gap of a predetermined size, and
wherein a distance between the first end face and the second end face of the holding sealing material is about 100 mm or less.

* * * * *